United States Patent
Li et al.

(10) Patent No.: US 9,540,565 B2
(45) Date of Patent: Jan. 10, 2017

(54) LIQUID CRYSTAL COMPOUNDS CONTAINING DIBENZOPYRAN DERIVATIVES OF NAPHTHENIC BASE AND APPLICATION THEREOF

(71) Applicant: SHIJIAZHUANG CHENGZHI YONGHUA DISPLAY MATERIALS CO., LTD, Shijiazhuang, Heibei province (CN)

(72) Inventors: Ming Li, Shijiazhuang (CN); Jin Song Meng, Shijiazhuang (CN); Guo Liang Yun, Shijiazhuang (CN); Fang Miao Zhang, Shijiazhuang (CN); Wen Hai Lu, Shijiazhuang (CN); Jia Deng, Shijiazhuang (CN); Lei Zhao, Shijiazhuang (CN)

(73) Assignee: SHIJIAZHUANG CHENGZHI YONGHUA DISPLAY MATERIALS CO., LTD, Shijiazhuang, Hebei Province (CN)

( * ) Notice: Subject to any disclaimer, the term of this patent is extended or adjusted under 35 U.S.C. 154(b) by 0 days.

(21) Appl. No.: 14/715,099

(22) Filed: May 18, 2015

(65) Prior Publication Data

US 2016/0230092 A1    Aug. 11, 2016

(30) Foreign Application Priority Data

Feb. 9, 2015    (CN) .......................... 2015 1 0064884

(51) Int. Cl.
  *C09K 19/34*    (2006.01)

(52) U.S. Cl.
  CPC ... *C09K 19/3402* (2013.01); *C09K 2019/3425* (2013.01)

(58) Field of Classification Search
  CPC ..................................................... C09K 19/34
  See application file for complete search history.

*Primary Examiner* — Chanceity Robinson
(74) *Attorney, Agent, or Firm* — Muncy, Geissler, Olds & Lowe, P.C.

(57) ABSTRACT

The present invention discloses liquid crystal compounds having dibenzopyran derivatives with cycloalkyl groups, and preparation methods and application thereof. The liquid crystal compounds having dibenzopyran derivatives with cycloalkyl terminal groups, shown in formula I, exhibit better miscibility and a very large negative dielectric constant, compared to those having a flexible alkyl chain as a terminal group, therefore the compounds of the present invention, shown in formula I, may improve the miscibility of liquid crystal compounds and broaden the application range of liquid crystal mixtures. In addition, the compounds may also increase the negative dielectric constants of liquid crystal mixtures, having an important application value.

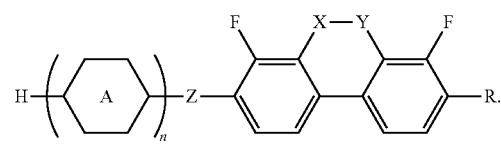

14 Claims, 4 Drawing Sheets

LIQUID CRYSTAL COMPOUNDS CONTAINING DIBENZOPYRAN DERIVATIVES OF NAPHTHENIC BASE AND APPLICATION THEREOF

TECHNICAL FIELD

The present invention relates to the field of liquid crystal compounds and application thereof, and relates to liquid crystal compounds having dibenzopyran derivatives with cycloalkyl groups, and preparation methods and application thereof.

BACKGROUND ART

Since 1888 in which F. Reinitzer, an Austrian scientist, synthesized liquid crystals for the first time, the real development of the liquid crystal industry just has been nearly 30 years. The liquid crystal display (LCD) materials have obvious advantages, such as low driving voltage, small power consumption, high reliability, large information display capacity, color display, no flickering, and possibility of flat panel display, liquid crystal monomers and LCD have experienced tremendous growth. Over 10,000 kinds of liquid crystal materials have been synthesized from liquid crystal monomers, thousands of which are commonly used. According to the center bridged bond and ring characteristics of liquid crystal molecules, the liquid crystal materials are mainly classified into biphenyl liquid crystals, phenylcyclohexane liquid crystals, ester liquid crystals, alkyne liquid crystals, difluoromethoxy bridge liquid crystals, ethyl liquid crystals, heterocyclic liquid crystals, etc. The liquid crystal display also has developed from black-and-white small-screen TN and STN 30 years ago to current color large-screen TN-TFT, VA-TFT, IPS-TFT, PDLC, etc.

Novel liquid crystal display modes mainly include optically compensated bend (OCB) mode, in-plane switching (IPS) mode, vertical alignment (VA) mode, axisymmetric microstructure (ASM) mode, multi-domain twisted nematic (TN) mode, etc.

Different display modes have different liquid crystal cell designs, different driving modes, as well as different liquid crystal directors and glass substrate directions. The liquid crystal director is parallel to the glass substrate direction in case of OCB and IPS modes, and perpendicular to the glass substrate direction in case of VA and ASM modes in the absence of an electric field.

In case of homogeneous alignment IPS mode, the liquid crystal dielectric anisotropy ($\Delta\epsilon$) may be either positive or negative.

As for the VA mode, all liquid crystal molecules are perpendicular the glass substrate direction and parallel to the vertical incident light at zero field. Being orthogonal, the polarizers exhibit good dark state, resulting good contrast, so that the dielectric anisotropy ($\Delta\epsilon$) of the used liquid crystal must be negative. The liquid crystal optical anisotropy ($\Delta n$), the liquid crystal cell thickness (d), the incident light wavelength ($\lambda$) have almost no effect on the contrast. The response time of the VA mode is much shorter than that of the TN mode, approximately around half. Under the influence the applied voltage, the VA device, the OCB device and the TN device generate bend, splay and twist deformation of liquid crystal molecules, respectively, and the response times are inversely proportional to the bend, splay and twist elastic constants, respectively. For most of the liquid crystals, normally, the bend elastic constant is larger than the splay elastic constant, and the splay elastic constant is larger than the twist elastic constant, which is the reason why the VA device has shorter response time.

DE10 2002 004 228.4 and JP2005120073 disclosed the following compound:

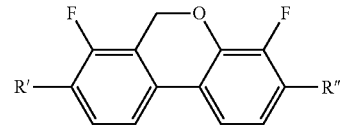

wherein R' and R" represent an alkyl group. The two lateral fluorine atoms and the intramolecular rigid dibenzopyran ring restrict the deflection between the two benzene rings, such that such compounds have higher absolute values of dielectric anisotropy, and very high birefringence. However, as the consequence of the rigid dibenzopyran ring, such alkyl-substituted dibenzopyran ring liquid crystal compounds have poor miscibility, and are easy to separate out at a low temperature. In order to make the performance of the display device closer to the ideal state, researchers have been working on novel liquid crystal compounds, which moves forward the continuous development of the performance of the liquid crystal compounds and display devices.

DETAILED DESCRIPTION OF THE INVENTION

In order to solve the above technical problem, the present invention provides liquid crystal compounds having dibenzopyran derivatives with cycloalkyl groups, and preparation methods and application thereof.

The liquid crystal compounds having dibenzopyran derivatives with cycloalkyl groups, provided by the present invention, have the following structural formula I,

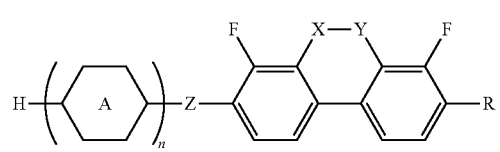

wherein in formula I, H represents a cyclopentyl group, a cyclobutyl group or a cyclopropyl group;

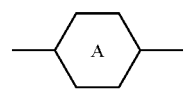

represents

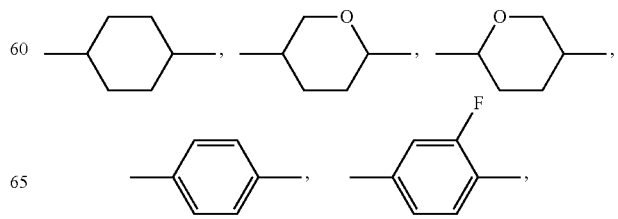

-continued

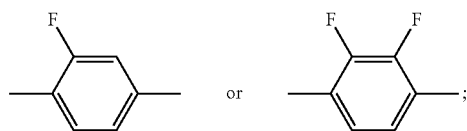

Z represents a single bond, —O—, —CH₂CH₂— or —CH₂O—; represents an alkyl group having 1 to 7 carbon atoms or an alkoxy group having 1 to 7 carbon atoms; X and Y represent —CH₂— or —O—, but are not the same group; and n represents 0 or 1.

The compounds shown in formula I are preferably compounds shown in the following formula I1 to formula I18:

I1

[structure]

I2

[structure]

I3

[structure]

I4

[structure]

I5

[structure]

I6

[structure]

I7

[structure]

I8

[structure]

-continued

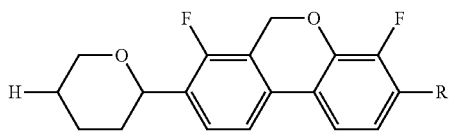

I9

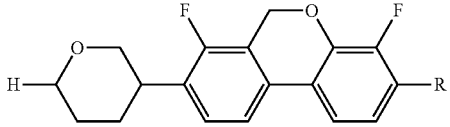

I10

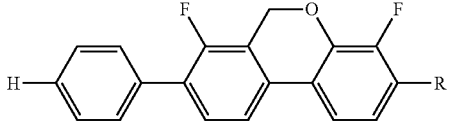

I11

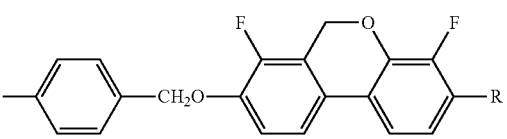

I12

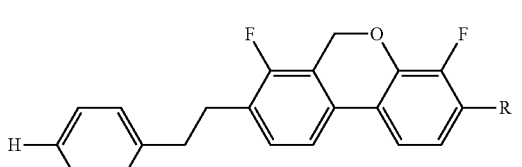

I13

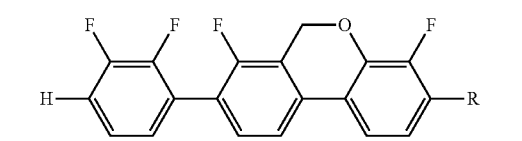

I14

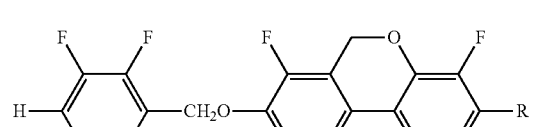

I15

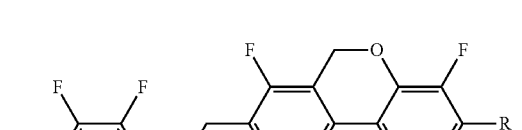

I16

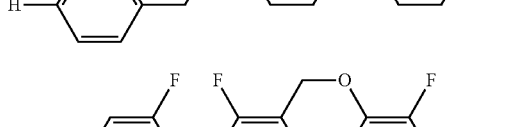

I17

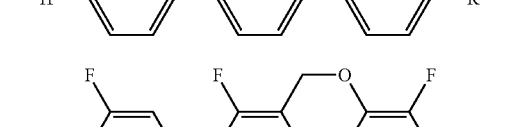

I18 wherein, in each of the compounds shown in formula (I1) to (I18), H represents a cyclopentyl group, a cyclobutyl group or a cyclopropyl group; R represents an alkyl group having 1 to 7 carbon atoms or an alkoxy group having 1-7 carbon atoms.
The compounds shown in formula I are preferably compounds shown in the following formula I1-1 to formula I18-1:
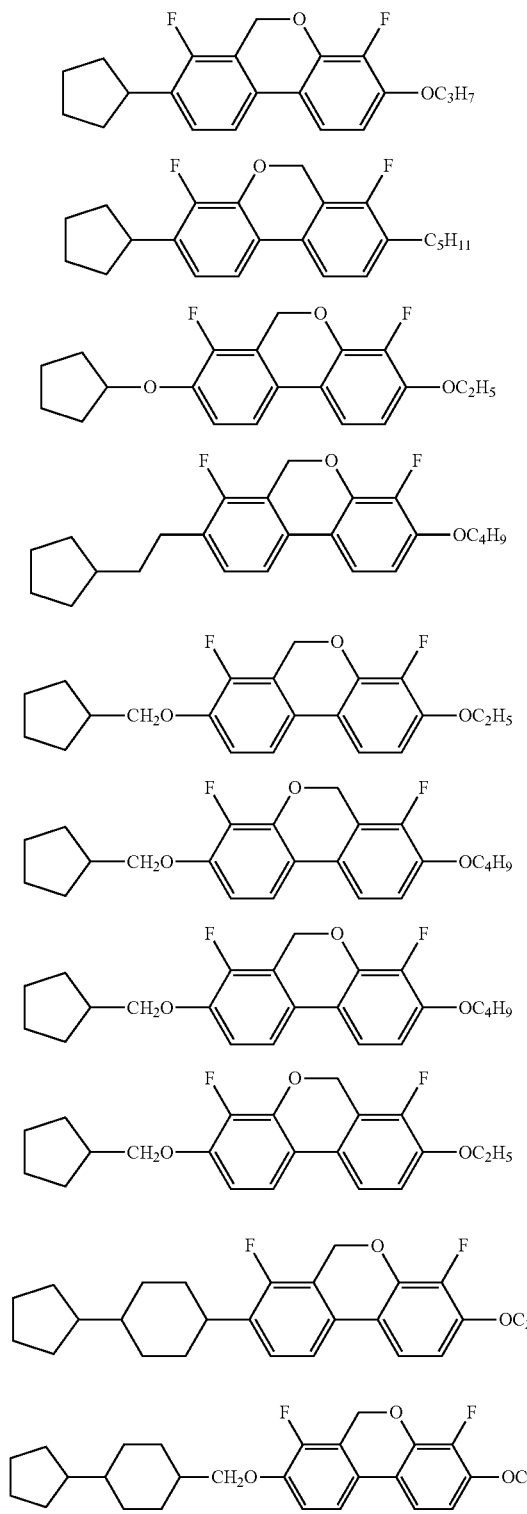
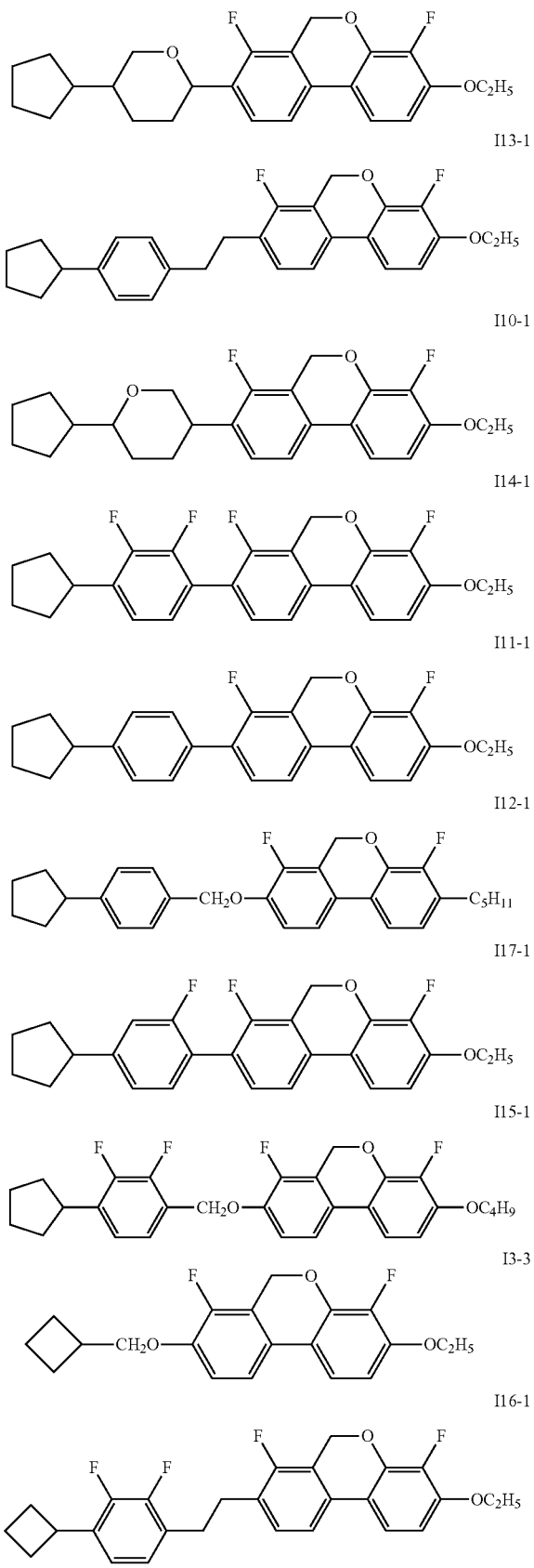

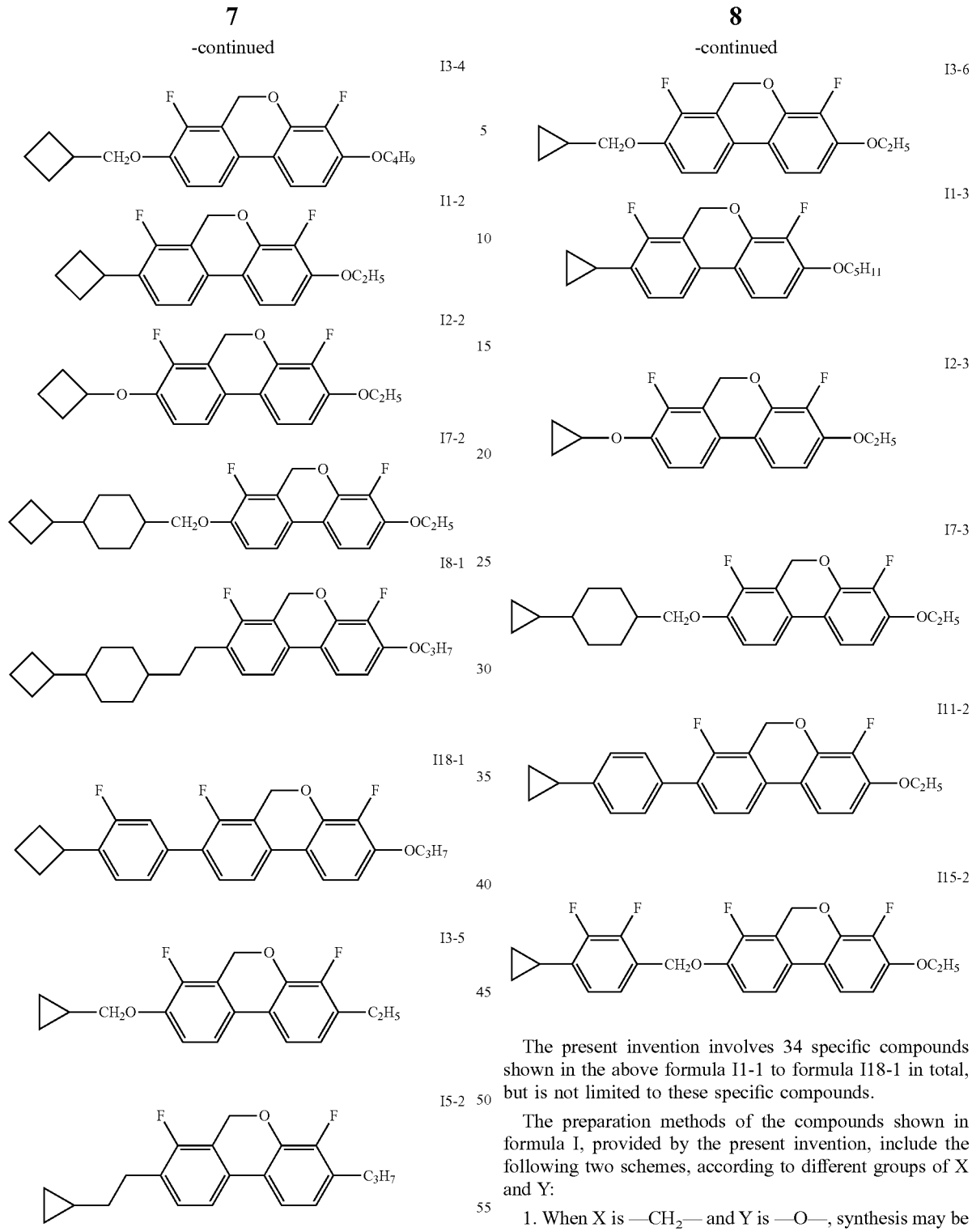

The present invention involves 34 specific compounds shown in the above formula I1-1 to formula I18-1 in total, but is not limited to these specific compounds.

The preparation methods of the compounds shown in formula I, provided by the present invention, include the following two schemes, according to different groups of X and Y:

1. When X is —CH$_2$— and Y is —O—, synthesis may be carried out by the following scheme:

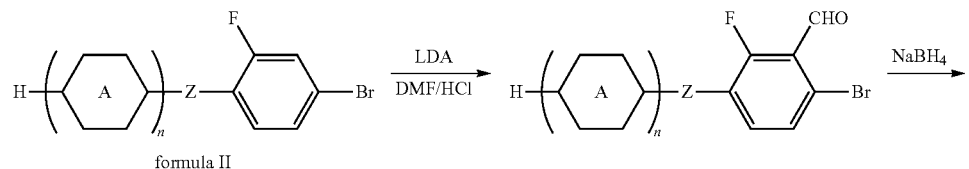

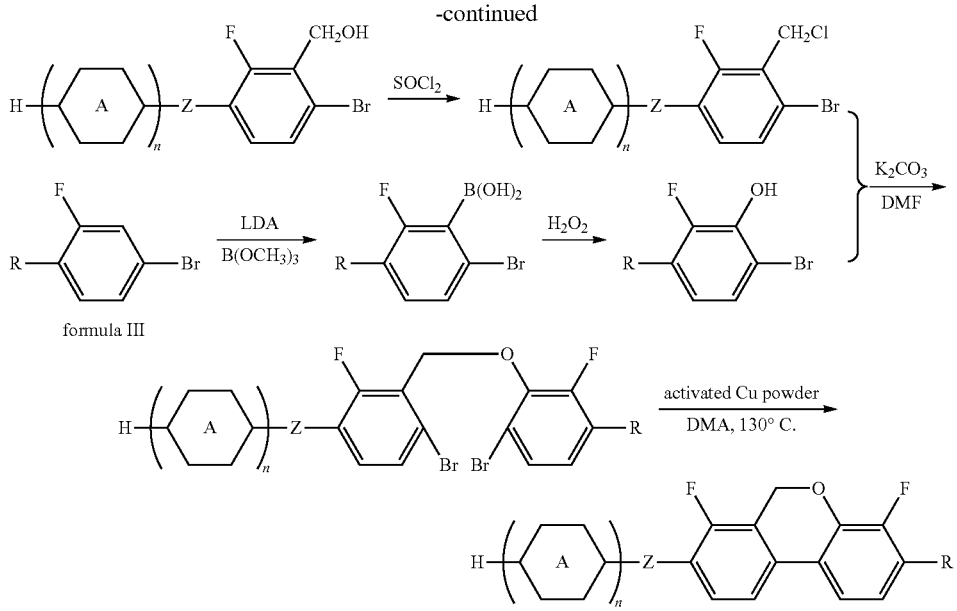

2. When X is —O— and Y is —CH₂—, synthesis may be carried out by the following scheme:

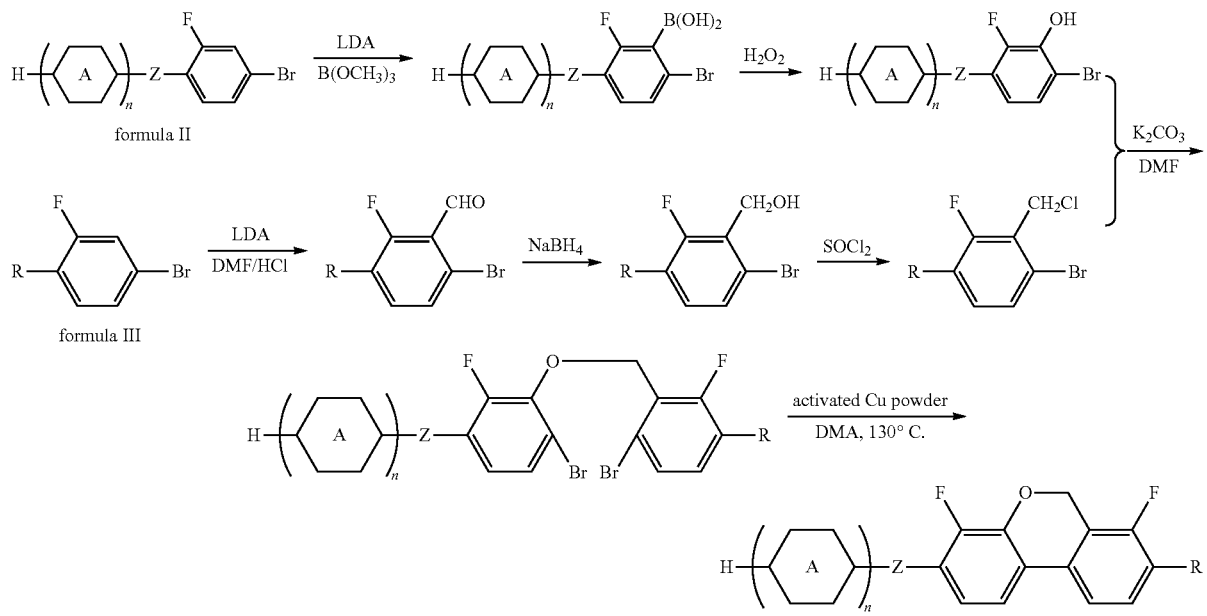

According to the synthesis routes shown in schemes 1 and 2, the compounds of formula II and formula III are key intermediates for synthesizing the target compounds.

formula II

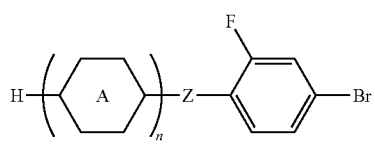

-continued formula III

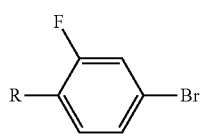

The compound of formula II may be synthesized by the following four methods, according to different A rings, different linkage groups Z, and different numbers of n:

wherein, the first method is applied in case that in formula II,

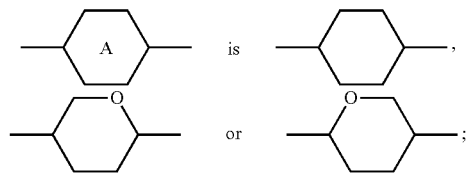

Z is a single bond; n is 0 or 1, and comprises the following steps:

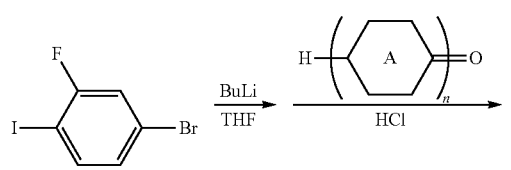

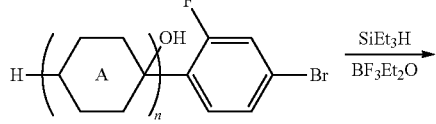

in particular, when n=0,

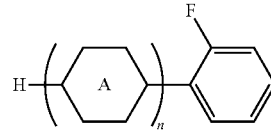

is a cycloalkanone, the intermediate of formula II may also be synthesized according to such method.

the second method is applied in case that in formula II,

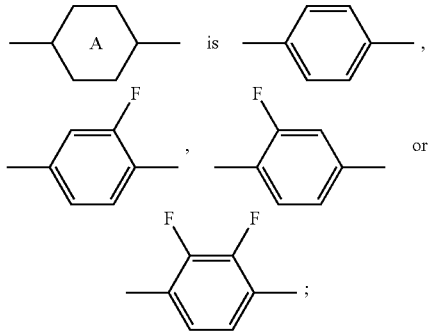

Z is a single bond; n is 1, and comprises the following step:

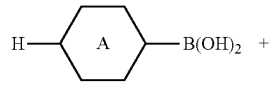

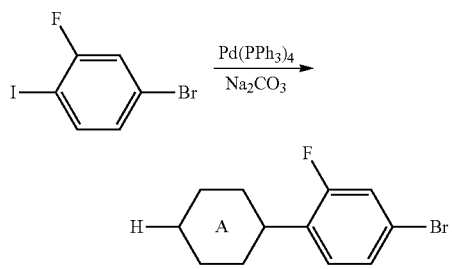

the third method is applied in case that in formula II,

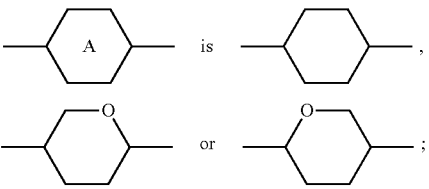

Z is —O— or —CH$_2$O—; n is 0 or 1, and comprises the following step:

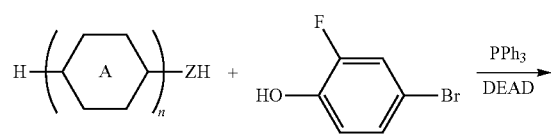

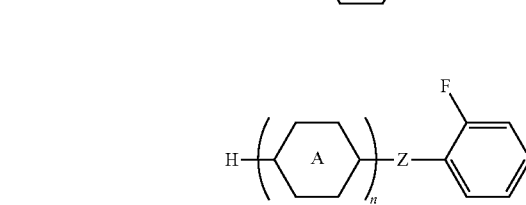

the fourth method is applied in case that in formula II,

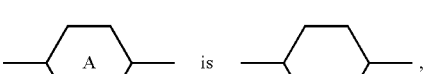
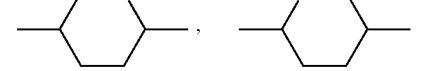
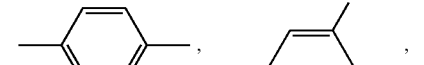

Z is —CH$_2$CH$_2$—; n is 0 or 1, and comprises the following steps:

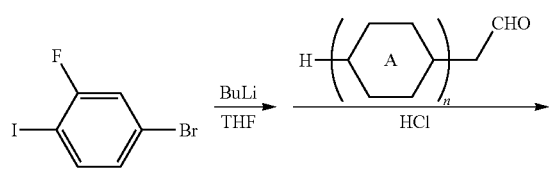

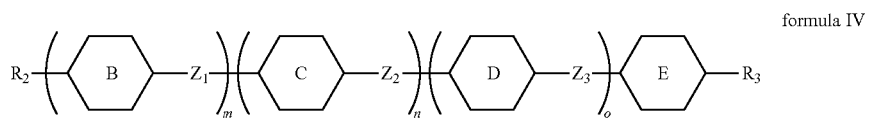

-continued

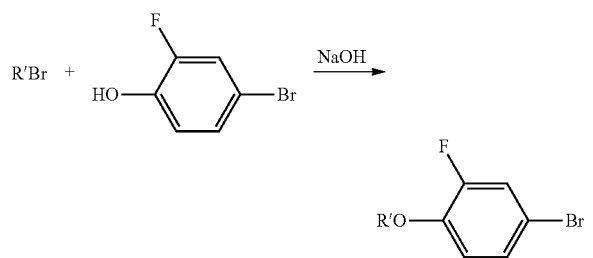

The compound of formula III may be synthesized by the following two methods, according to different R groups:

wherein the first method is applied in case that in formula III, R is an alkoxy group, and comprises the following step:

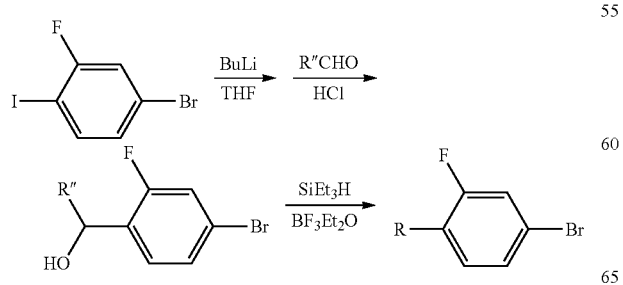

R' is an alkyl group having 1 to 7 carbon atoms;

the second method is applied in case that in formula III, R is an alkyl group, and comprises the following steps:

R" is H or an alkyl group having 1 to 6 carbon atoms;

All of the steps in all of the above methods are carried out in a solvent which is at least one selected from tetrahydrofuran, N,N-dimethylformamide, ethanol, methanol, methylene chloride, acetone, toluene and deionized water.

The present invention also provides a liquid crystal medium, comprising one or more compounds denoted by formula I.

The liquid crystal medium further comprises one or more liquid crystal compounds denoted by formula IV as a second component:

formula IV $$R_2 \left( B \right)_{\!\!m} \!\! Z_1 \left( C \right)_{\!\!n} \!\! Z_2 \left( D \right)_{\!\!o} \!\! Z_3 \left( E \right) R_3$$

in formula IV, $R_2$ and $R_3$ each independently represent any of the following groups (1) to ($^3$):

(1) a linear alkyl group having 1 to 7 carbon atoms or a linear alkoxy group having 1 to 7 carbon atoms;

(2) a group formed by substituting one or more —$CH_2$— in any of the groups in (1) with —O—, —COO—, —OOC— or —CH=CH—;

(3) a group formed by substituting one or more —H in any of the groups in (1) with —F, —Cl, —CH=$CH_2$ or —CH=CH—$CH_3$;

rings B, C, D and E each independently represent the following groups:

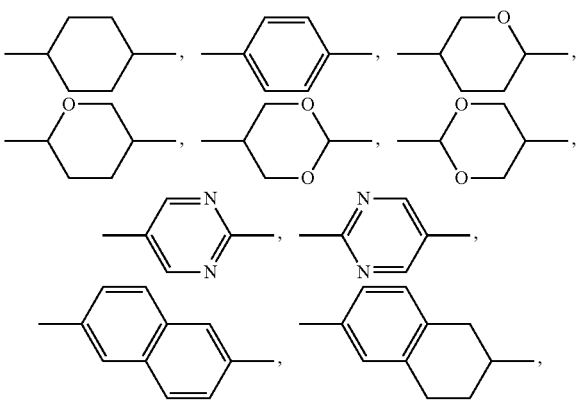

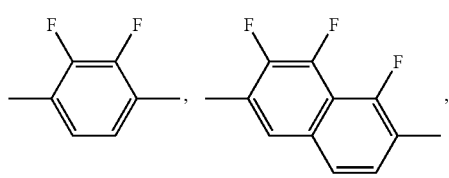

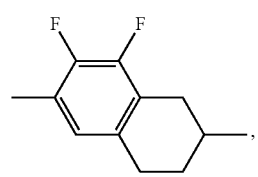

and at least one of the rings B, C, D and E is selected from

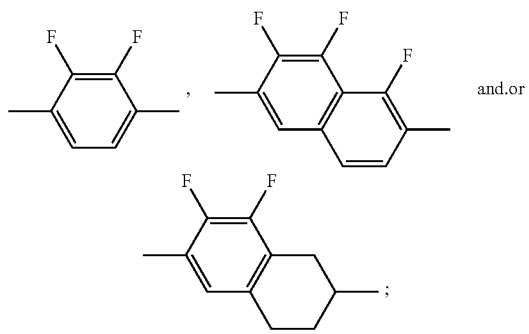

m, n and o each independently represent 0 or 1;
$Z_1$, $Z_2$ and $Z_3$ each independently represent a single bond, —$C_2H_4$—, —CH=CH—, —COO—, —OOC—, —$CH_2O$—, —$OCH_2$—, —$CF_2O$— or —$OCF_2$—; additionally, any H atom in the groups may be substituted by F atom.

Furthermore, the liquid crystal medium of the present invention further comprises one or more compounds shown in formula V as a third component:

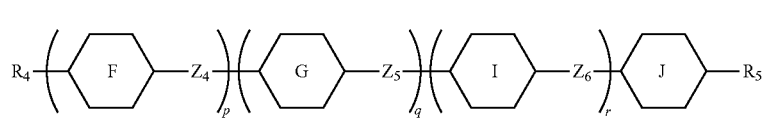

V in formula V, $R_4$ and $R_5$ each independently represent an alkyl group having 1 to 10 carbon atoms or an alkenyl group having 2 to 10 carbon atoms; additionally, any —$CH_2$— in the groups may be substituted by —$CH_2O$—, —$OCH_2$— or —C≡C—, and any H atom in the groups may be substituted by F atom;

rings F, G, I, and J each independently represent the following groups:

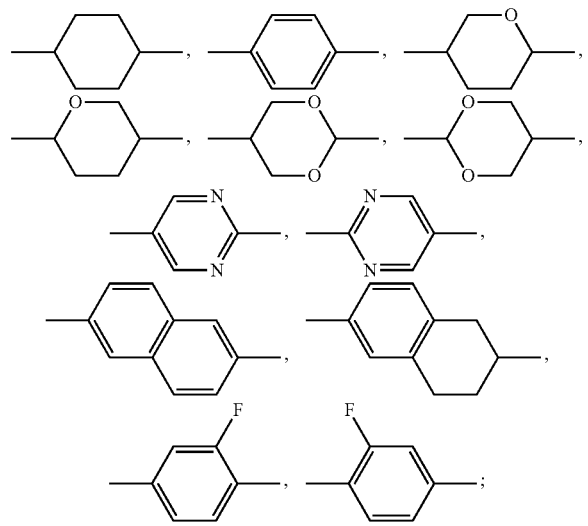

p, q and r each independently represent 0 or 1;
$Z_4$, $Z_5$ and $Z_6$ each independently represent a single bond, —$C_2H_4$—, —CH=CH—, —COO—, —OOC—, —$CH_2O$—, —$OCH_2$—, —$CF_2O$— or —$OCF_2$—; additionally, any H atom in the groups may be substituted by F atom.

The compounds shown in formula IV are preferably one or more of the following components:

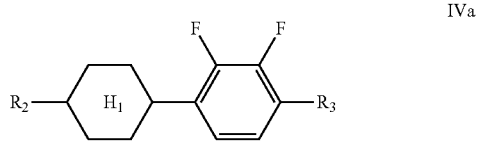

IVa

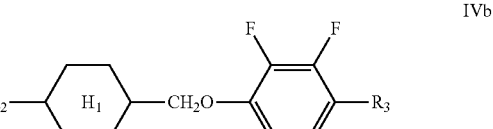

IVb

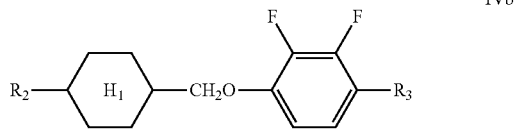

IVc

-continued

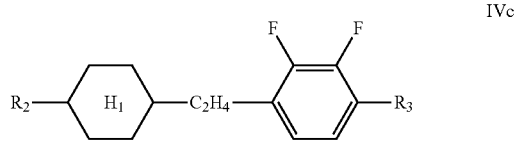

IVd

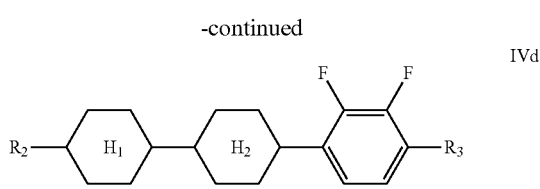

IVe

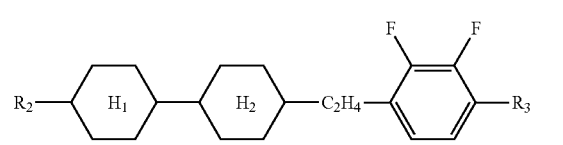

IVf

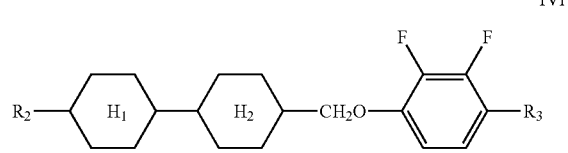

IVg

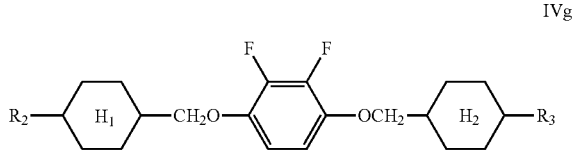

IVh

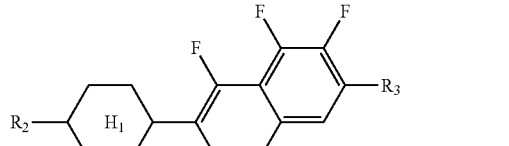

-continued

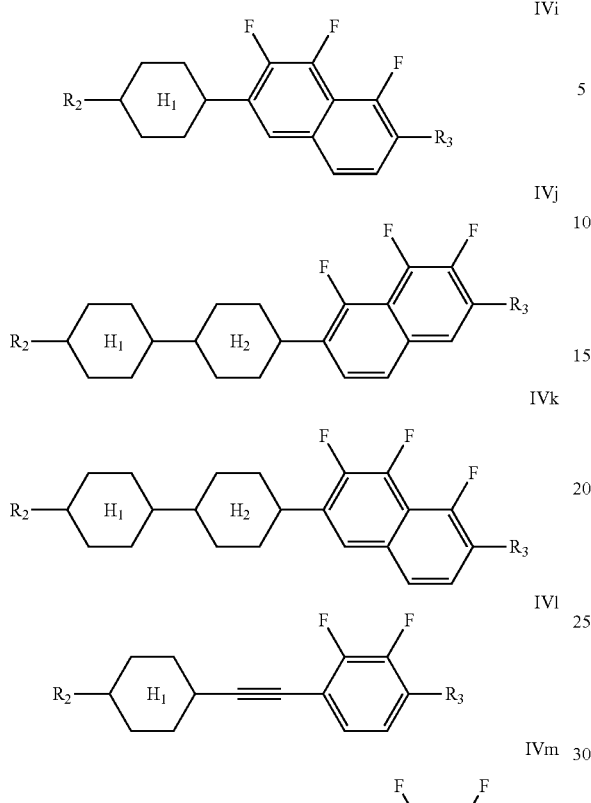

wherein $R_2$ and $R_3$ each independently represent any of the following groups (1) to (3):

(1) a linear alkyl group having 1 to 7 carbon atoms or a linear alkoxy group having 1 to 7 carbon atoms;

(2) a group formed by substituting one or more —CH$_2$— in any of the groups in (1) with —O—, —COO—, —OOC— or —CH=CH—;

(3) a group formed by substituting one or more —H in any of the groups in (1) with —F, —Cl, —CH=CH$_2$ or —CH=CH—CH;

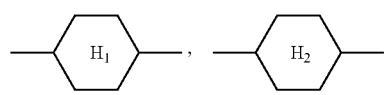

each independently represent any of the following groups:

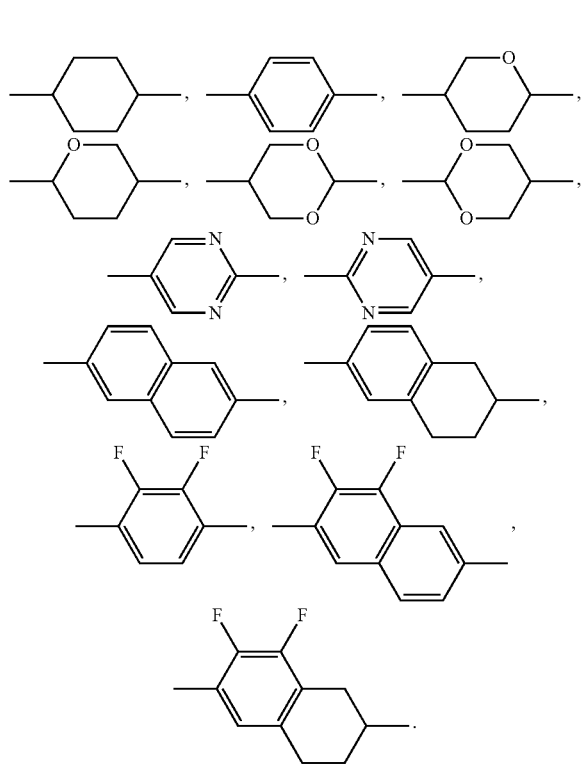

The compounds shown in formula V are preferably one or more of the following components:

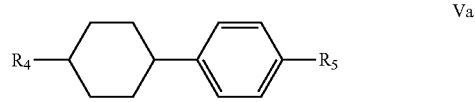 Va

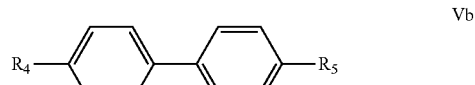 Vb

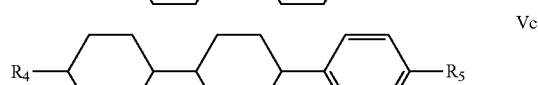 Vc

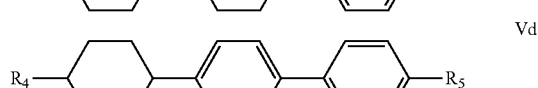 Vd

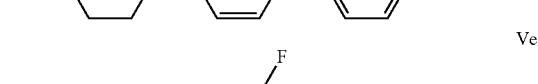 Ve

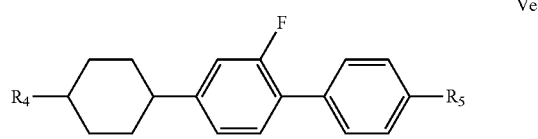 Vf

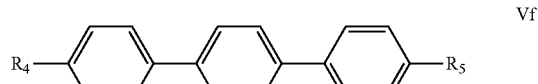 Vg

-continued

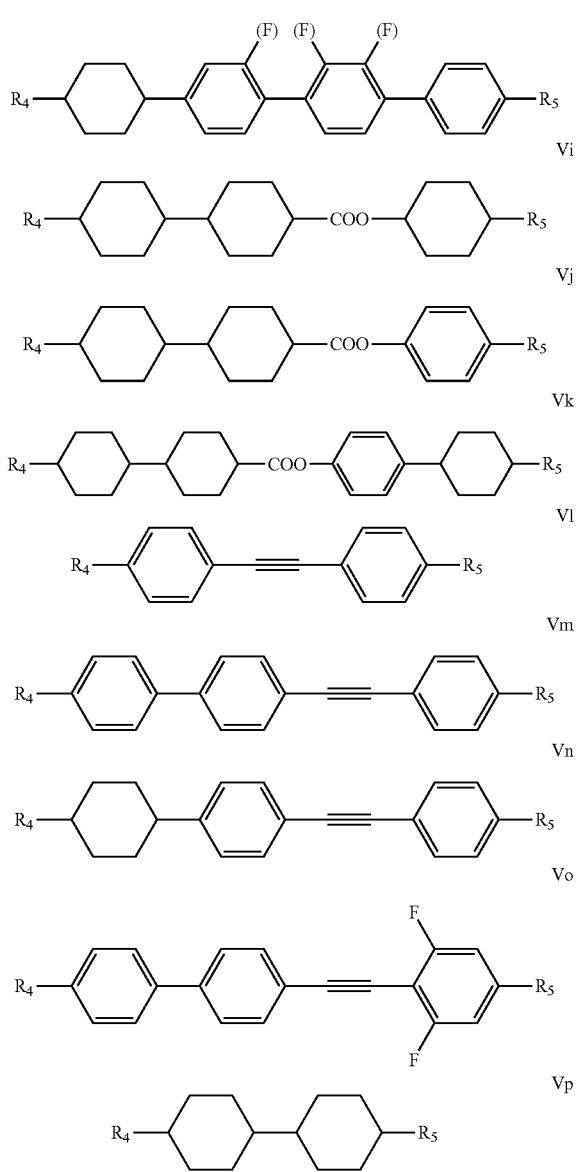

wherein $R_4$ and $R_5$ each independently represent an alkyl group having 1 to 10 carbon atoms or an alkenyl group having 2 to 10 carbon atoms; additionally, any —CH$_2$— in the groups may be substituted by —CH$_2$O—, —OCH$_2$— or —C≡C—, and any H atom in the groups may be substituted by F atom; (F) each independently represents F or H.

The application of the compounds shown in formula I, provided by the present invention, in preparing liquid crystal mixtures, liquid crystal display device materials or electrooptic display device materials, as well as the liquid crystal mixtures, the liquid crystal display device materials or the electrooptic display device materials comprising the compounds shown in formula I also fall into the protection scope of the present invention.

Owning to the presence of the intramolecular rigid structure and the two lateral fluorine atoms, the dibenzopyran liquid crystals exhibit a large negative dielectric constant. Surprisingly, when cycloalkyl groups are introduced into the dibenzopyran liquid crystal molecule, the resulting liquid crystal compounds exhibit better miscibility and a very large negative dielectric constant, compared to the dibenzopyran liquid crystal compounds having a flexible alkyl chain as a terminal group, therefore, the compounds shown in formula I, provided by the present invention, may improve the miscibility of liquid crystal compounds and broaden the application range of liquid crystal mixtures; in addition, the compounds also may increase the negative dielectric constants of the liquid crystal mixtures, having an important application value.

DESCRIPTION OF THE PREFERRED EMBODIMENTS

Figure 1:
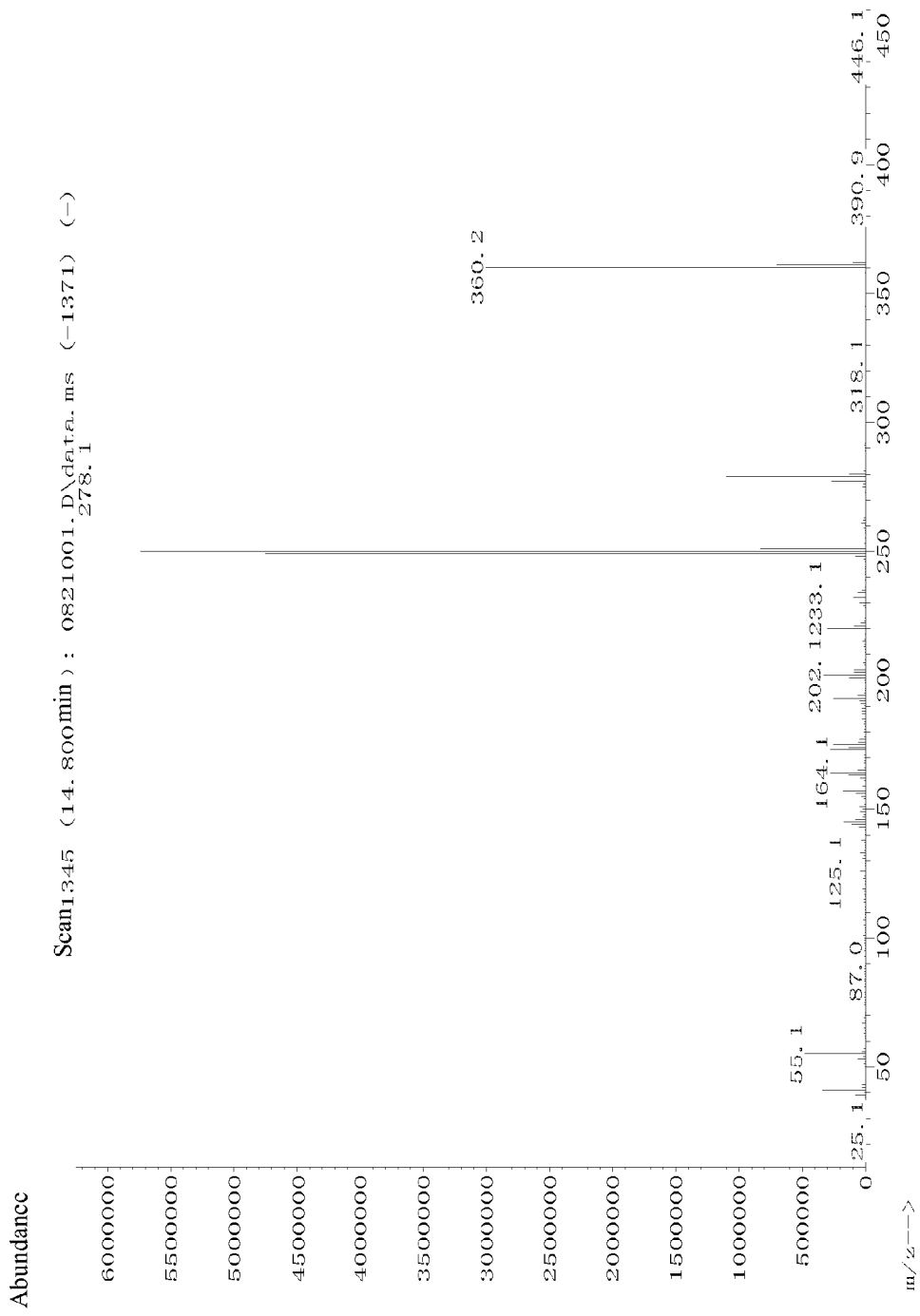
FIG. 1 is the mass spectrum of the compound shown in formula I3-1.
Figure 2:
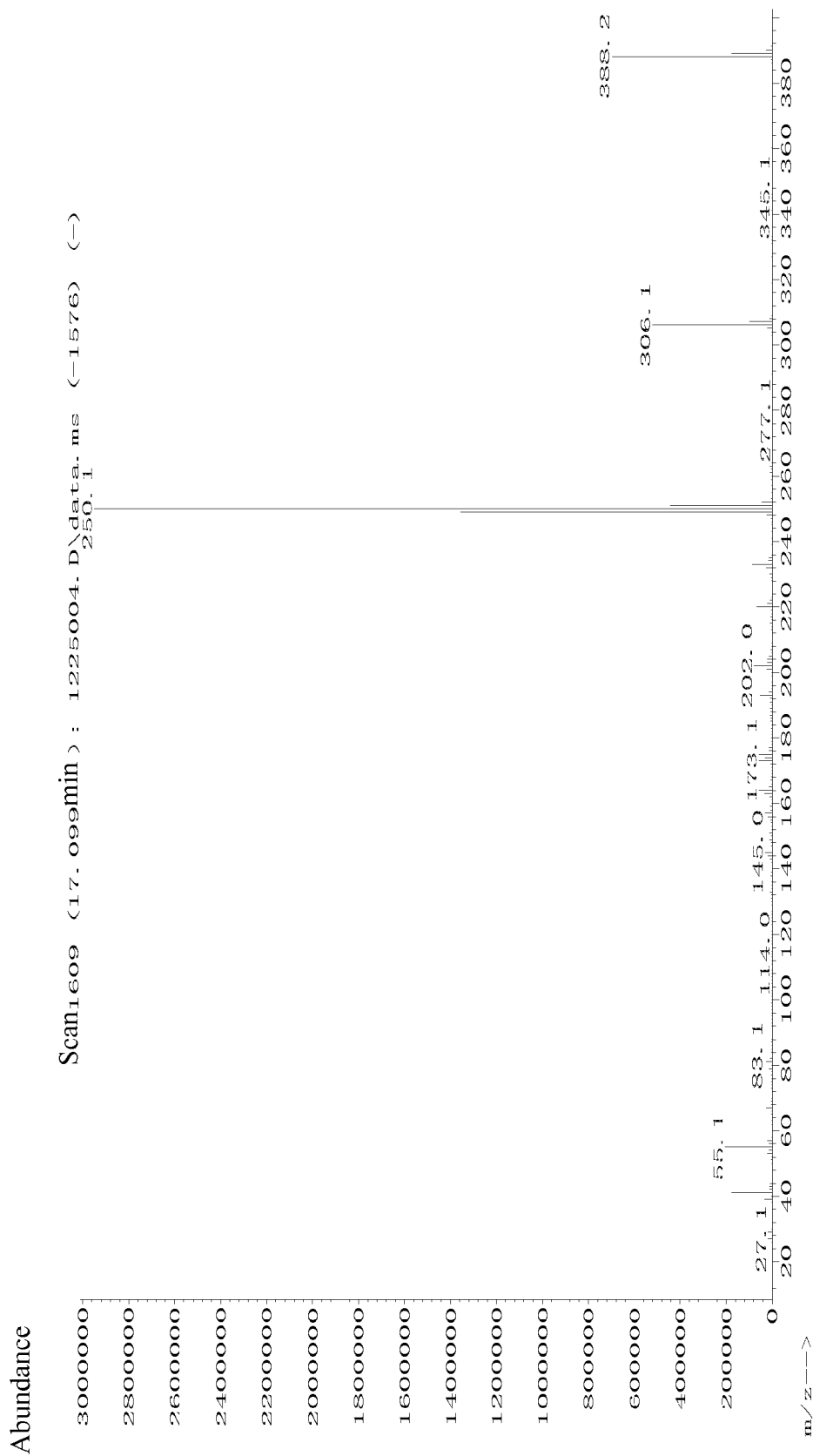
FIG. 2 is the mass spectrum of the compound shown in formula I3-2.
Figure 3:
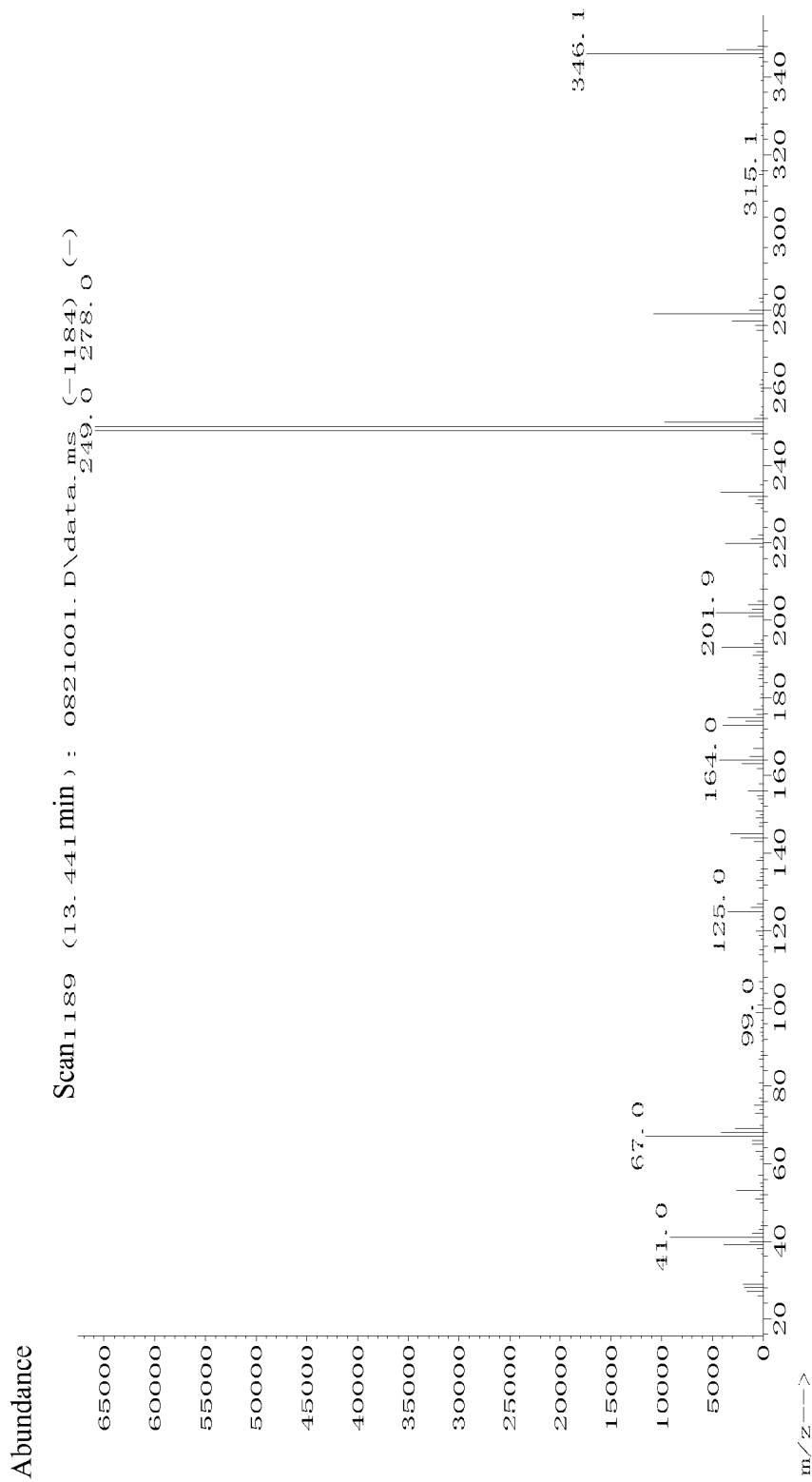
FIG. 3 is the mass spectrum of the compound shown in formula I3-3.
Figure 4:
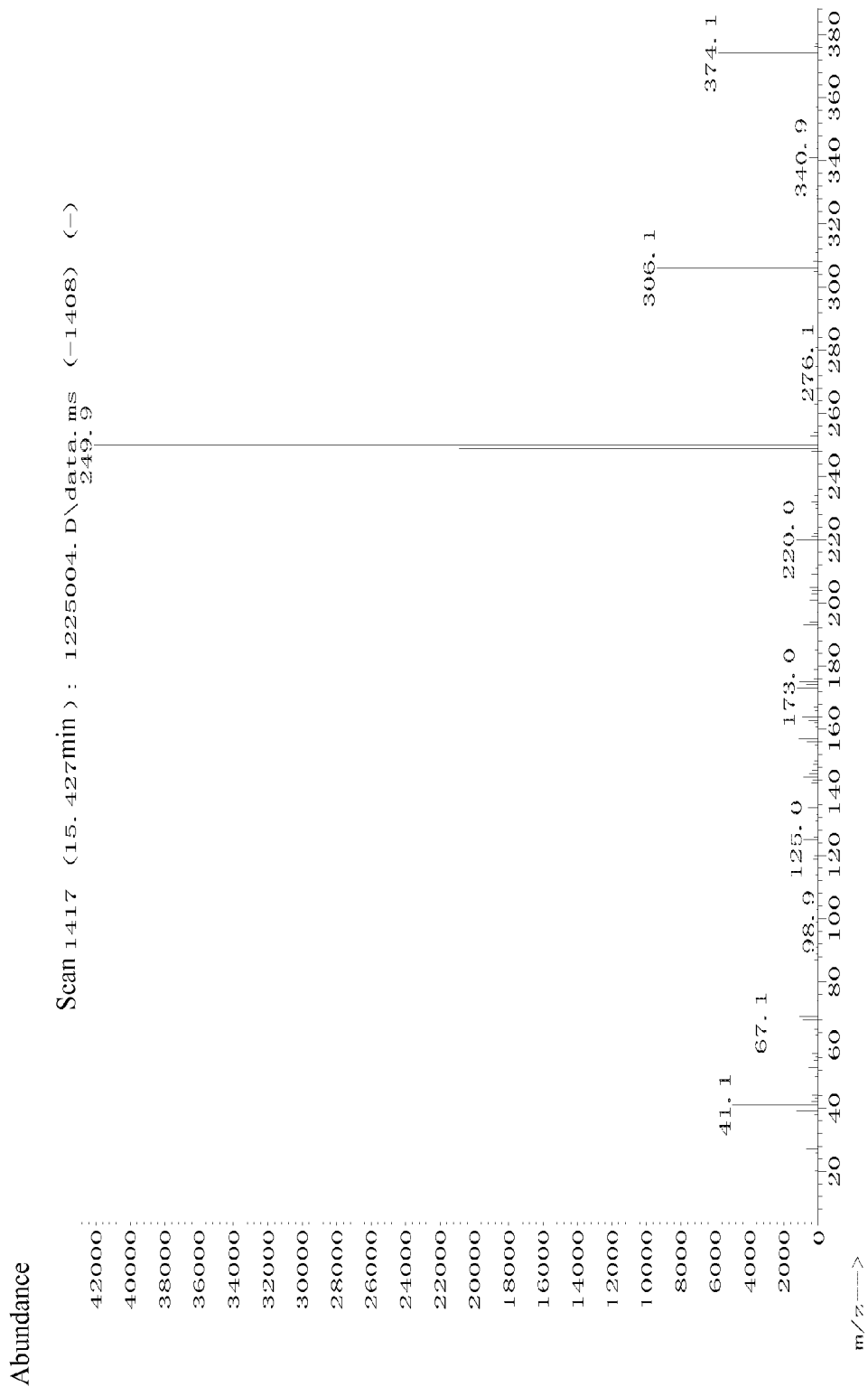
FIG. 4 is the mass spectrum of the compound shown in formula I3-4.

The present invention is further described using specific embodiments, but is not limited to the following examples. The methods are conventional methods if not specifically indicated. The raw materials are obtained commercially if not specifically indicated. In the following examples, GC represents a gas chromatography purity, MP represents a melting point, CP represents a clearing point, MS represents a mass spectrum, Δ∈ represents a dielectric anisotropy, and Δn represents an optical anisotropy. The determinations of GC, MP, CP, MS, Δ∈ and Δn are all conventional methods.

Example 1 Compound shown in formula I3-1

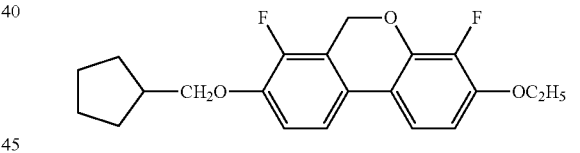

Step 1

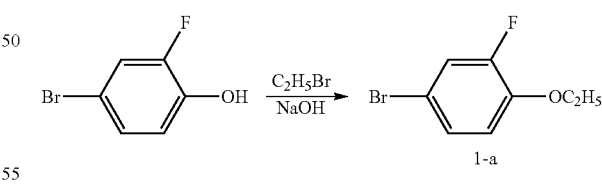

48 g (0.25 mol) of 2-fluoro-4-bromo-phenol, 30 g (0.275 mol) of bromoethane, 15 g (0.375 mol) of sodium hydroxide, 1 g of tetrabutylammonium bromide and 500 mL of acetone were put into a 1 L three-necked flask, and heated under reflux for 3 hours while stirring. After cooling to room temperature, the reaction mixture was poured into 500 mL of deionized water, and extracted with ethyl acetate twice. After liquid separation, the organic layers were combined, and then washed with 500 mL of deionized water once, followed by removal of solvent by evaporation under reduced pressure. The obtained solution was distilled under reduced pressure, and the fraction (750 Pa, 80° C.) was collected to obtain a colorless transparent liquid (1-a) 47 g, GC 97.5%, and yield 86%.

Step 7

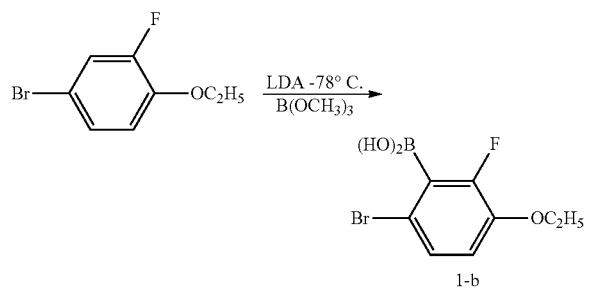

46 g (0.21 mol) of the compound (1-a) and 150 mL of tetrahydrofuran were put into a 1 L three-necked flask, and stirred. Nitrogen gas was introduced into the flask to replace air. The mixture was refrigerated to −78° C. in a cold bath with liquid nitrogen, 200 ml (0.23 mol) of 2.5M diisobutyl propylamino lithium petroleum ether solution was added dropwise within 0.5 hours. After reaction for 0.5 hours, 25 ml of tetrahydrofuran solution containing 27 g (0.25 mol) of trimethyl borate was added dropwise at −78° C. within 0.5 hours to give a transparent solution. The cold bath was removed, when the temperature of the solution was naturally increased to −20° C. (2 hours), the solution was poured into 750 ml of deionised water containing 100 ml of hydrochloric acid for hydrolysis. After liquid separation, the water layer was extracted with 500 ml of ethyl acetate, and then the organic layers were combined and washed with water to neutral, followed by removal of solvent by evaporation under reduced pressure. Then, 150 ml of petroleum ether was added. The resulting solution was heated to boil, and filtered after cooling to give 55 g of pale yellow crystals (1-b), yield 85%.

Step 3

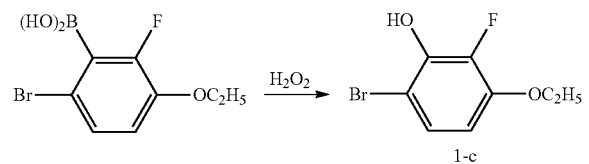

57 g (0.21 mol) of the compound (1-b) and 300 mL of tetrahydrofuran were put into a 1 L three-necked flask, and stirred. After the compound (1-b) is completely dissolved in tetrahydrofuran, 160 g of hydrogen peroxide and 5 ml of glacial acetic acid were added, stirred, and heated under reflux for 7 hours. Then, the reaction was stopped, and the reaction solution was cooled to room temperature. After 300 ml of methylene chloride was added, the solution was shaken for liquid separation. The water layer was extracted with 300 ml×2 dichloromethane, and the dichloromethane layers were combined, washed with 300 ml×2 saturated sodium chloride aqueous solution, and dried over 25 g of anhydrous sodium sulfate. The solution obtained was dried by spinning to give 60 g of a pale yellow liquid, which was then distilled under reduced pressure. The fraction (500 Pa, around 150° C.) was collected to give 42 g of a colorless transparent liquid (1-c), GC 96.8%, yield 82%.

Step 4

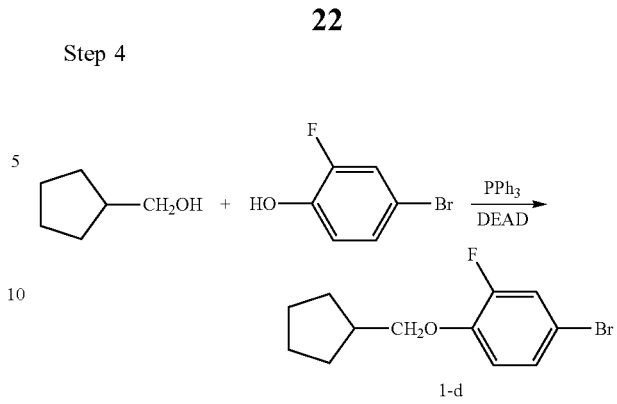

57 g (0.30 mol) 4-bromo-2-fluorophenol, 36 g (0.36 mol) cyclopentylmethanol, 118 g (0.45 mol) of triphenylphosphine and 300 mL of tetrahydrofuran were put into a 1 L three-necked flask, and stirred until all compounds were dissolved. After the solution was cooled to 0° C. to 5° C. under nitrogen protection, 78 g (0.45 mol) of diethyl azodicarboxylate (DEAD) and 300 ml of tetrahydrofuran solution were added dropwise within half an hour, and stirred at 0° C. to 5° C. for half an hour and then stirred at room temperature overnight. Then, the reaction was stopped. The reaction solution was extracted with 500 ml×2 petroleum ether, and the organic layers were combined, washed twice with mixture of 50 ml of ethanol and 100 ml of water, and dried over anhydrous sodium sulfate. After removal of solvent by evaporation, recrystallization was carried out at −20° C. with 100 g of ethanol to give 67 g of a white solid (1-d), GC 97.2%, yield 82%.

Step 5

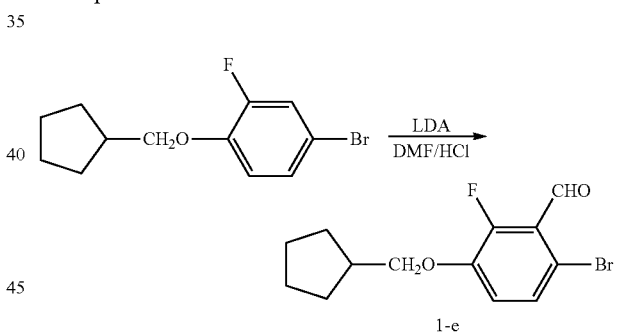

67 g (0.25 mol) of the compound (1-d) and 400 ml of tetrahydrofuran were put into 1 L three-necked flask, and stirred. After the solution was refrigerated to −70° C. under nitrogen protection, 108 ml (0.27 mol) of 2.5M lithium diisopropylamide petroleum ether solution was added dropwise within 15 min while controlling the temperature lower than −70° C. The solution obtained was stirred for 45 min while holding the temperature, and then 20 g (0.27 mol) of DMF was added dropwise within 15 min while controlling the temperature lower than −70° C. The solution obtained was then stirred for 30 min while controlling the temperature lower than −70° C., followed by natural temperature rise. When the temperature is around −20° C., 10% hydrochloric acid was added to adjust the pH value to 1-2, and then the solution was stirred for 10 min, followed by extraction with 500 ml of dichloromethane. The water layer was extracted with 250 ml×2 dichloromethane, and then the organic layers were combined, washed with 250 ml×2 saturated sodium chlorine aqueous sodium, and dried over 30 g of anhydrous sodium sulfate. After the solution obtained was dried by spinning, 100 g of petroleum ether was added, and heated for complete dissolution. Recrystallization of the solution was carried out at −20° C., followed by suction filtration to give 50 g of a white solid (1-e), GC 96.1%, yield 67%.

Step 6

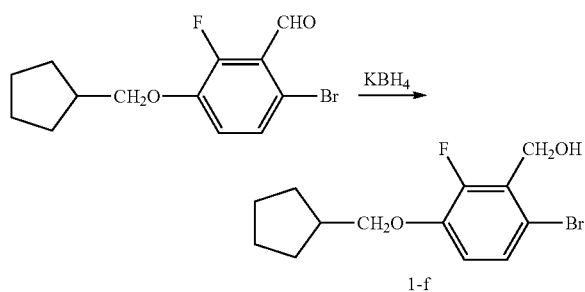

50 g (0.17 mol) of the compound (1-e), 300 ml of tetrahydrofuran and 100 ml of water were added into a 1 L three-necked flask, and then stirred. 13.5 g (0.25 mol) of potassium borohydride was added batchwise. After the solution obtained was stirred at room temperature for 1 hour, and stirred under heat reflux for 3 hours, the reaction was stopped. 500 ml of dichloromethane and 500 ml of water were added for extraction. The water layer was extracted with 250 ml×2 dichloromethane, and then the organic layers were combined, washed with 350 ml×2 saturated sodium chlorine aqueous sodium, and dried over 30 g of anhydrous sodium sulfate. After the solution obtained was dried by spinning, 90 g of petroleum ether was added, and heated for complete dissolution. Recrystallization of the solution was carried out at −20° C., followed by suction filtration to give 42 g of a white solid (1-f), HPLC 98.5%, yield 84%.

Step 7

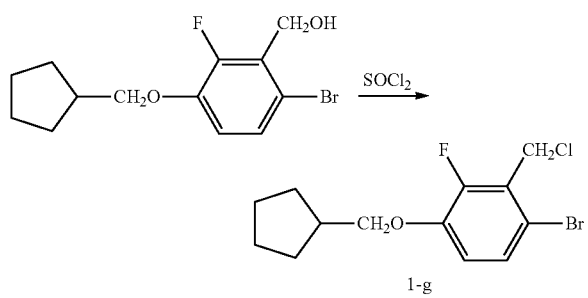

42 g (0.14 mol) of the compound (1-f) and 400 mL of dichloromethane were added into a 1 L three-necked flask, and then stirred. 33 g (0.28 mol) dichlorosulfoxide was added dropwise. After reaction for 4 hours under room temperature stirring, the reaction was stopped. 500 ml of water were added for extraction. The water layer was extracted with 250 ml×2 dichloromethane, and then the organic layers were combined, washed with 350 ml×2 saturated sodium chlorine aqueous sodium, and dried over 30 g of anhydrous sodium sulfate. After the solution obtained was dried by spinning, 50 g of petroleum ether and 50 g of ethanol were added, and heated for complete dissolution. Recrystallization of the solution was carried out at −20° C., followed by suction filtration to give 37 g of a white solid (1-g), GC 98.0%, yield 83%.

Step 8

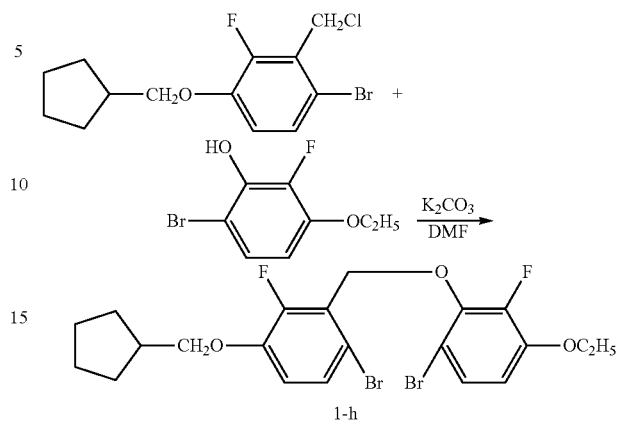

37 g (0.116 mol) of the compound (1-g), 27 g (0.116 mol) of the compound (1-c), 24 g (0.174 mol) of potassium carbonate and 400 ml of DMF were added into a 1 L three-necked flask, and then stirred. The solution was heated to 90° C., and stirred for 5 hours. The reaction was then stopped. After being cooled, the reaction solution was poured into 500 ml of ice water, and stirred for 5 min. 300 ml of dichloromethane was added for extraction. The water layer was extracted with 250 ml×2 dichloromethane, and then the organic layers were combined, washed with 300 ml×2 saturated sodium chlorine aqueous sodium, and dried over 30 g of anhydrous sodium sulfate. After the solution obtained was dried by spinning, 100 g of petroleum ether and 50 g of ethanol were added, and heated for complete dissolution. Recrystallization of the solution was carried out at −20° C., followed by suction filtration to give 50 g of a white solid (1-h), HPLC 96.4%, yield 834%.

Step 9

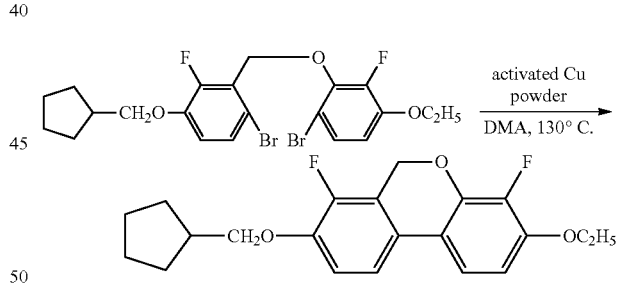

50 g (0.096 mol) of the compound (1-h), 61 g (0.96 mol) of activated copper powder and 500 ml of dimethylacetamide (DMA) were added into a 1 L three-necked flask. The solution was heated to 130° C., and stirred for 48 hours for reaction. Then, the reaction was stopped, and the reaction solution was cooled to room temperature. 1 L of water and 500 ml of ethyl acetate were added, and stirred, followed by liquid separation. The water layer was extracted with 300 ml×2 dichloromethane, and then the organic layers were combined, washed with 400 ml×2 saturated sodium chlorine aqueous sodium, and dried over 30 g of anhydrous sodium sulfate. After the solution obtained was dried by spinning, 200 ml of petroleum ether was added, and heated for complete dissolution. The solution was passed through 30 g of hot silica gel column, and the column was rinsed with 400 ml of hot petroleum ether in twice. After the solution was dried by spinning to around 30 ml, recrystallization of the solution was carried out at −20° C. twice to give 5.0 g of a white solid (I3-1), GC 99.72%, yield 14%.

Example 2 Compound shown in 14-2

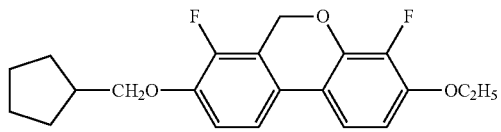

Step 1

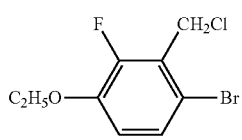
(2-a)

was synthesized with the compound (1-a) as a starting material according to the steps 5, 6 and 7 in Example 1;

Step 2

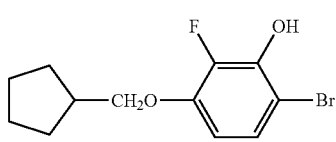
(2-b)

was synthesized with the compound (1-d) as a starting material according to the steps 2 and 3 in Example 1;

Step 3

The target compound I4-2

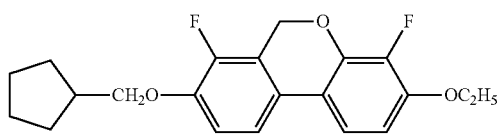

was synthesized with the compounds (2-a) and (2-b) as starting materials according to the steps 8 and 9 in Example 1.

Example 3 Compound shown in formula I1-1

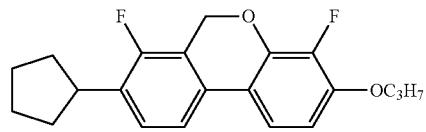

Step 1

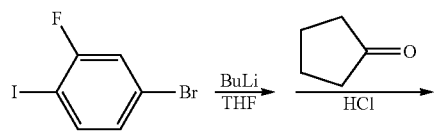

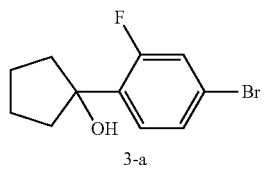
3-a 60 g (0.20 mol) of 4-bromo-2-fluoroiodobenzene and 300 mL of tetrahydrofuran were added into a 1 L three-necked flask, and stirred. Nitrogen gas was introduced into the flask to replace air. The mixture was refrigerated to −78° C. in a cold bath with liquid nitrogen, 88 ml (0.22 mol) of 2.5M butyl lithium petroleum ether solution was added dropwise within half an hour. After reaction for half an hour, 25 ml of tetrahydrofuran solution containing 18.5 g (0.22 mol) of cyclopentanone was added dropwise at −78° C. within half an hour. The cold bath was removed, when the temperature of the solution was naturally increased to −20° C., the solution was poured into 5% hydrochloric acid aqueous solution for hydrolysis, and the pH value was adjusted to around 2. After liquid separation, the water layer was extracted with 500 ml×2 ethyl acetate, and then the organic layers were combined and washed with water to neutral, followed by removal of solvent by evaporation under reduced pressure. Then, 150 ml of petroleum ether was added, and recrystallization was carried out at −20° C. to give 45 g of a white solid (3-a), GC 97.8%, yield 87%.

Step 2

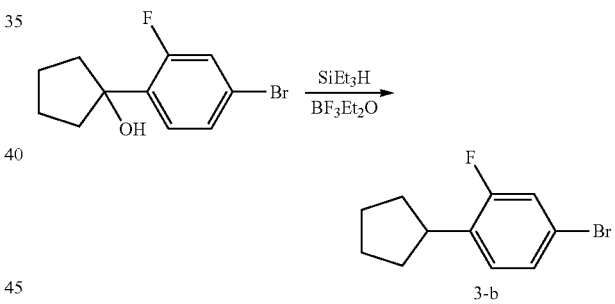
3-b 45 g (0.174 mol) of the compound (3-a) and 300 ml of dichloromethane were added into a 1 L three-necked flask, and stirred. Nitrogen gas was introduced into the flask to replace air. The mixture was refrigerated to −78° C. in a cold bath with liquid nitrogen, 24.3 g (0.21 mol) of triethylsilane was added dropwise within half an hour. After reaction for half an hour, 30 g (0.21 mol) of boron trifluoride diethyl etherate was added dropwise at −78° C. within half an hour. The cold bath was removed, when the temperature of the solution was naturally increased to −20° C., the solution was poured into 300 ml of water. After liquid separation, the water layer was extracted with 200 ml×2 dichloromethane, and then the organic layers were combined, washed with 400 ml×2 saturated sodium chloride aqueous solution, and dried over 30 g of anhydrous sodium sulfate. After the solution obtained was dried by spinning, 150 ml of anhydrous ethanol were added, and recrystallization was carried out at −20° C. to give 37 g of a white solid (3-b), GC 98.6%, yield 88%.

Step 3

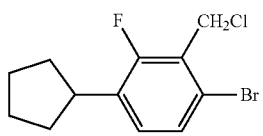
(3-c)

was synthesized with the compound (3-b) as a starting material according to the steps 5, 6 and 7 in Example 1;

Step 4

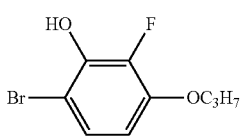
(3-d)

was synthesized according to the steps 2 and 3 in Example 1, with bromoethane replaced by bromopropane;

Step 5

The target compound I1-1

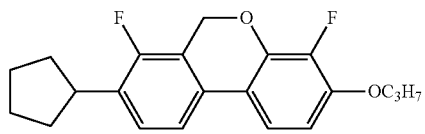

was synthesized with the compounds (3-d) and (3-c) as starting materials according to the steps 8 and 9 in Example 1.

Example 4 Compound shown in formula I3-5

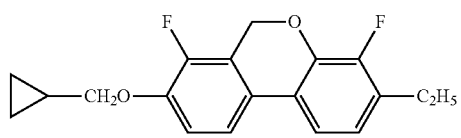

Step 1

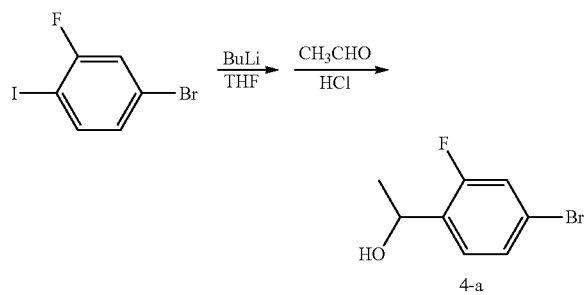

60 g (0.20 mol) of 4-bromo-2-fluoroiodobenzene and 300 mL of tetrahydrofuran were added into a 1 L three-necked flask, and stirred. Nitrogen gas was introduced into the flask to replace air. The mixture was refrigerated to −78° C. in a cold bath with liquid nitrogen, 88 ml (0.22 mol) of 2.5M butyl lithium petroleum ether solution was added dropwise within half an hour. After reaction for half an hour, 25 ml of tetrahydrofuran solution containing 9.7 g (0.22 mol) of acetaldehyde was added dropwise at −78° C. within half an hour. The cold bath was removed, when the temperature of the solution was naturally increased to −20° C., the solution was poured into 5% hydrochloric acid aqueous solution for hydrolysis, and the pH value was adjusted to around 2. After liquid separation, the water layer was extracted with 400 ml×2 ethyl acetate, and then the organic layers were combined and washed with water to neutral, followed by removal of solvent by evaporation under reduced pressure. Then, 80 ml of petroleum ether was added, and recrystallization was carried out at −20° C. to give 38 g of a white solid (4-a), GC 95.6%, yield 88%.

Step 2

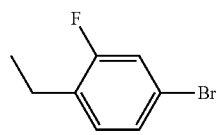
(4-b)

was synthesized with the compound (4-a) as a starting material according to the step 2 in Example 3;

Step 3

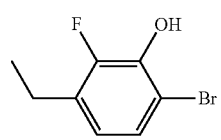
(4-c)

was synthesized with the compound (4-b) as a starting material according to the steps 2 and 3 in Example 1;

Step 4

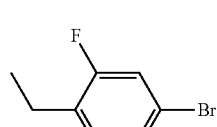
(4-d)

was synthesized according to the steps 4, 5, 6 and 7, with cyclopentylmethanol replaced by cyclopropylmethanol;

Step 5

The target compound I3-5

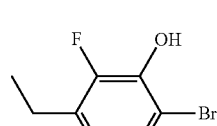

was synthesized with the compounds (4-d) and (4-c) as starting materials according to the steps of 8 and 9 in Example 1.

Example 5 Compound shown in formula I5-1

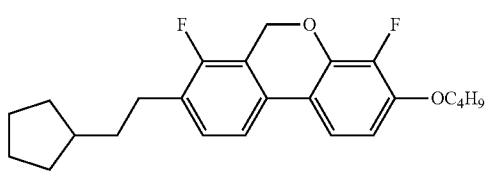

Step 1

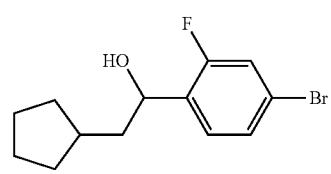
(5-a)

was synthesized according to the step 1 in Example 4, with acetaldehyde replaced by cyclopentyl acetaldehyde;

Step 2

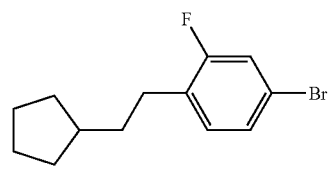
(5-b)

was synthesized with (5-a) as a starting material according to the step 2 in Example 3;

Step 3

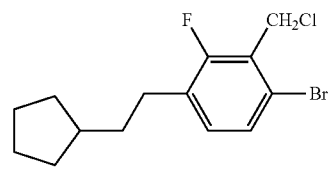
(5-c)

was synthesized with (5-b) as a starting material according to steps 6 and 7 in Example 1;

Step 4

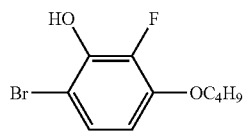
(5-d)

was synthesized according to the steps 1, 2 and 3 in Example 1, with bromoethane replaced by bromobutane;

Step 5
The target compound I5-1

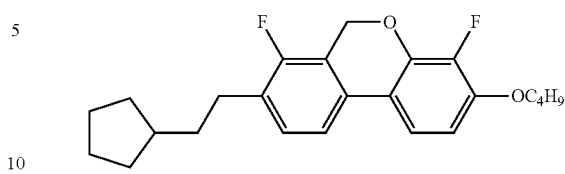

was synthesized with the compounds (5-c) and (5-d) as starting materials according to the steps 8 and 9 in Example 1.

Example 6 Compound shown in formula I11-1

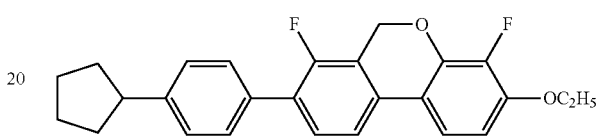

Step 1

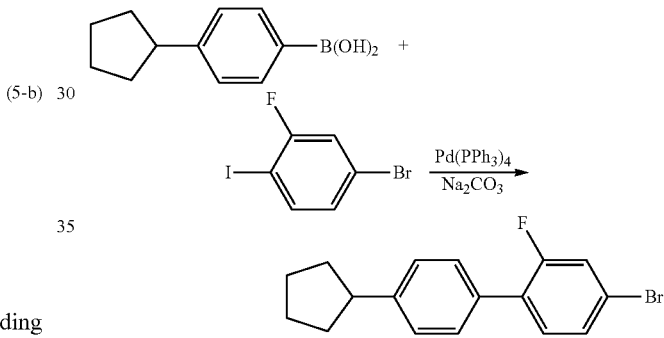

57 g (0.30 mol) of 4-cyclopentylbenzo acid, 90 g (0.30 mol) of 4-bromo-2-fluoroiodobenzene, 300 ml of ethanol and 500 ml of toluene were added into a 2 L three-necked flask. 10 g of tetrabutylammonium bromide and 48 g (0.45 mol) of sodium carbonate were added into 300 ml of water, stirred, and then poured into the reaction solution, and then the reaction solution was stirred and heated to 50° C. 1.5 g of palladium was added under nitrogen protection, and then the reaction solution was stirred at 50° C. After reaction for 8 hours, the reaction was stopped, and then the reaction solution was cooled, followed by liquid separation. The water layer was extracted with 400 ml×2 toluene, and the organic layers were combined, washed with 500 ml×2 saturated sodium chloride aqueous solution, and dried over 40 g of anhydrous sodium sulfate. After the solution obtained was dried by spinning, 300 ml of petroleum ether were added, and recrystallization was carried out at −20° C. to give 80 g of a white solid (6-1), GC 97.5%, yield 84%.

Step 2

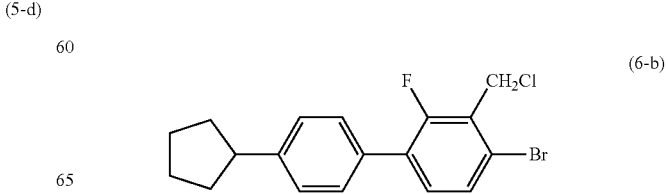
(6-b)

was synthesized with (6-a) as a starting material according to the steps 5, 6, and 7 in Example 1;

Step 3

The target compound I11-1

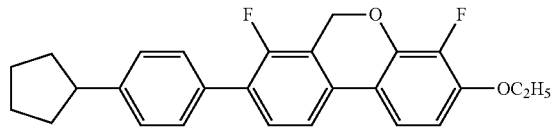

was synthesized with (6-b) and (1-c) as starting materials according to the steps 8 and 9 in Example 1.

Example 7 Compound shown in formula I3-3

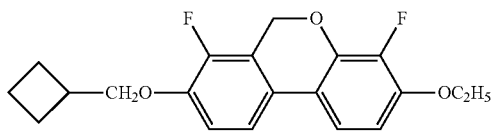

Step 1

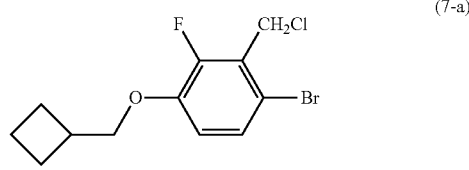

was synthesized with cyclobutylmethanol as a starting material according to the steps of 4, 5, 6 and 7 in Example 1;

Step 2

The target compound I3-3

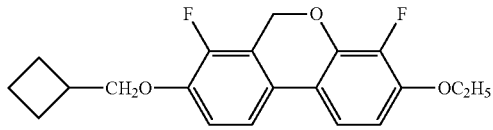

was synthesized with (7-a) and (1-c) as starting materials according to the steps 8 and 9 in Example 1.

Example 8 Compound shown in formula I3-6

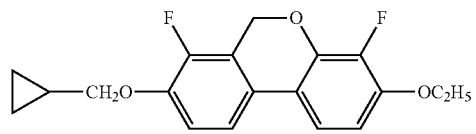

Step 1

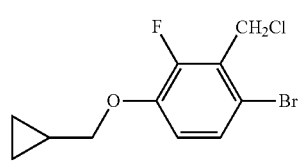

was synthesized with cyclobutylmethanol as a starting material according to the steps 4, 5, 6 and 7 in Example 1;

Step 2

The target compound I3-6

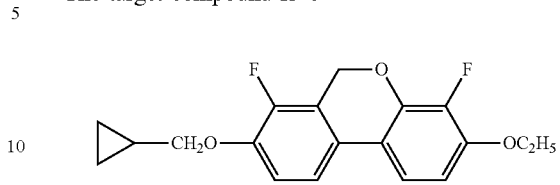

was synthesized with (8-a) and (1-c) as starting materials according to the steps 8 and 9 in Example 1.

Example 9 Compound shown in formula I3-2

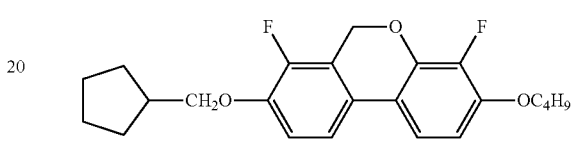

Step 1

The target compound I3-2

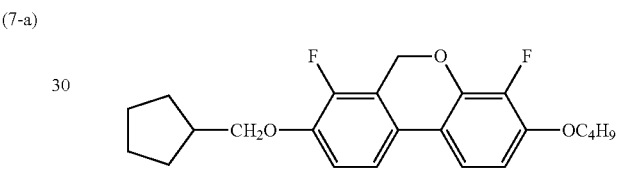

was synthesized with (1-g) and (5-d) as starting materials according to the steps 8 and 9 in Example 1.

Example of Mixture:

The number of parts involved in each of the Examples below is weight percentage, the unit of temperature is ° C., and the specific meaning of other symbols and test conditions are as follows:

S—N represents the melting point of liquid crystal from crystalline state to nematic state (° C.);

c.p. represents the clearing point of liquid crystal (° C.), test equipment: Mettler-Toledo-FP System microscopic thermal analyzer;

γ1 represents rotation viscosity (mPa·s), test conditions: 25° C., INSTEC:ALCT-IR1, 18 μm vertical alignment cell;

$K_{11}$ represents twist elastic constant, $K_{33}$ represents splay elastic constant, test conditions: 25° C., INSTEC:ALCT-IR1, 18 μm vertical alignment cell;

Δ∈ represents dielectric anisotropy, Δ∈=∈$_{//}$−∈$_{⊥}$, wherein ∈$_{//}$ is dielectric constant parallel to the molecular axis, ∈$_{⊥}$ is dielectric constant perpendicular to the molecular axis, test conditions: 25° C., INSTEC:ALCT-IR1, 18 μm vertical alignment cell;

Δn represents an optical anisotropy, Δn=$n_o$−$n_e$, wherein $n_o$ represents the refractive index of ordinary light, $n_e$ represents the refractive index of non-ordinary light, test conditions: 589 nm, 25±0.2° C.;

In the following Examples 1 to 11, the liquid crystal compounds of formula I, II, III and IV were weighted in proportion, respectively, to prepare the liquid crystal media. The used liquid crystal monomers may be synthesized by known methods, or obtained commercially.

Apparatus and equipment for preparing the liquid crystal media include:
(1) Electronic precision balance (accuracy 0.1 mg);
(2) Stainless steel beaker: used for weighing the liquid crystal;
(3) Spoon: used for feeding monomer;
(4) Magnetic rotor: used for stirring;
(5) Temperature-controlled magnetic stirrer.

The preparation method for the liquid crystal media comprises the following steps:
(1) The monomers used were placed neatly in order;
(2) The stainless steel beaker was placed on the balance, and the monomers were placed into the stainless steel beaker with the spoon;
(3) The monomer liquid crystals were added in sequence according to the required amounts;
(4) The stainless steel beaker containing the added materials was placed on the magnetic stirrer, and the heated to melt the materials;
(5) After most of the mixture in the stainless steel beaker was melted, a magnetic rotor was added into the stainless steel beaker, and the liquid crystal mixture was stirred, and cooled to room temperature to obtain the liquid crystal medium.

The obtained liquid crystal medium was filled in the space between the substrates of the liquid crystal display for property tests. The monomer structures and the amounts (weight percentage) of the specific compounds, as well as the property parameter test results of the resulting liquid crystal medium are all listed in the following Tables.

TABLE 1

Proportions and property parameters of liquid crystal composition of Example 10

| Compound Formula | Liquid Crystal Structural Formula | Weight Percentage (%) | Property Parameters |
|---|---|---|---|
| V | 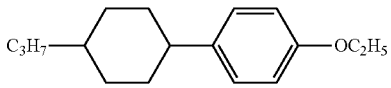 | 3 | S-N: ≤−40° C.<br>c.p: 92° C.<br>$\gamma_1$: 145 mPa · s<br>Δn: 0.110<br>$n_e$: 1.605<br>Δε: −4.3<br>$\epsilon_\perp$: 8.15<br>$K_{11}/K_{33}$: 15.3/16.3<br>The composition has no crystallization when being put at −20° C. for 480 h. |
| V | 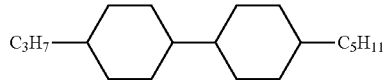 | 10 | |
| V | 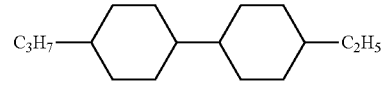 | 10 | |
| V | 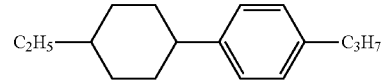 | 10 | |
| IV | 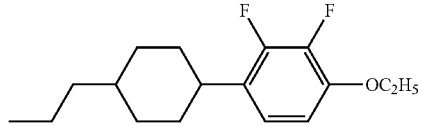 | 9 | |
| IV | 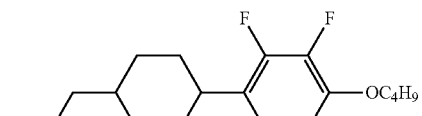 | 9 | |
| IV | 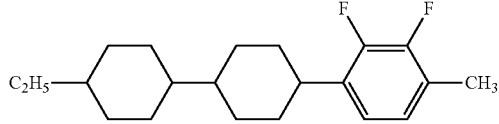 | 8 | |
| IV | 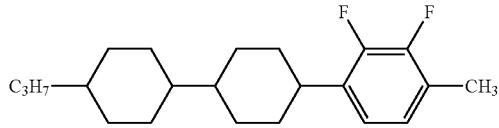 [SMILES: CCC1CCC(C2CCC(c3ccc(C)c(F)c3F)CC2)CC1] | 4 | |

TABLE 1-continued

Proportions and property parameters of liquid crystal composition of Example 10

| Compound Formula | Liquid Crystal Structural Formula | Weight Percentage (%) | Property Parameters |
|---|---|---|---|
| IV | C$_3$H$_7$—[Cy]—[Cy]—[Ph(F)(F)]—OC$_2$H$_5$ | 3 | |
| IV | C$_2$H$_5$—[Cy]—[Cy]—[Ph(F)(F)]—OC$_2$H$_5$ | 5 | |
| IV | C$_4$H$_9$—[Cy]—[Ph]—[Naph(F)(F)(F)]—OC$_2$H$_5$ | 5 | |
| IV | C$_2$H$_5$—[Cy]—[Ph]—[Ph(F)(F)]—OC$_2$H$_5$ | 6 | |
| IV | C$_3$H$_7$—[Cy]—[Ph(F)(F)]—C$_2$H$_4$—[Ph(F)(F)]—OC$_2$H$_5$ | 2 | |
| I | cyclopentyl-CH$_2$O—[Ph(F)-O-CH$_2$-Ph(F)]—OC$_2$H$_5$ | 9 | |
| I | cyclopentyl-CH$_2$CH$_2$—[Ph(F)-O-CH$_2$-Ph(F)]—OC$_2$H$_5$ | 7 | |

TABLE 2

Proportions and property parameters of liquid crystal composition of Example 11

| Compound Formula | Liquid Crystal Structural Formula | Weight Percentage (%) | Property Parameters |
|---|---|---|---|
| V | C$_3$H$_7$—[Cy]—[Cy]—CH=CH$_2$ | 38 | S-N: ≤−40° C.<br>c.p: 100° C.<br>$\gamma_1$: 165 mPa·s<br>$\Delta n$: 0.115<br>$n_e$: 1.617<br>$\Delta\epsilon$: −6.3<br>$\epsilon_\perp$: 11.1<br>$K_{11}/K_{33}$: 15.1/16.6 |

TABLE 2-continued
Proportions and property parameters of liquid crystal composition of Example 11
| Compound Formula | Liquid Crystal Structural Formula | Weight Percentage (%) | Property Parameters |
|---|---|---|---|
| V |  | 3 | |
| IV | 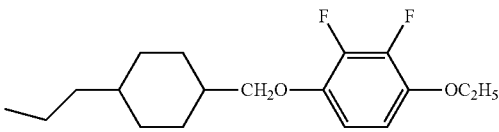 | 5 | |
| IV | 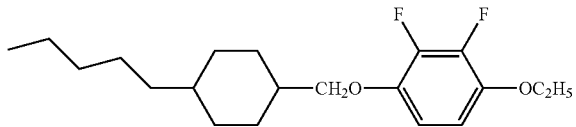 | 8 | |
| IV | 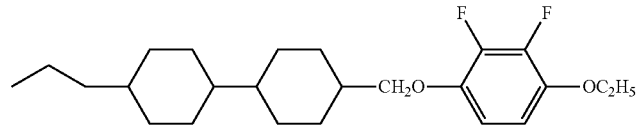 | 5 | |
| IV | 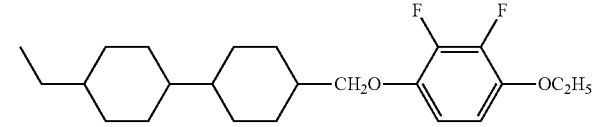 | 5 | |
| IV | 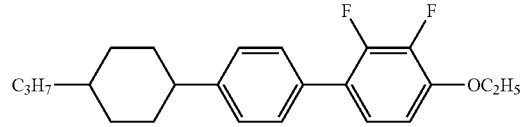 | 6 | |
| IV | 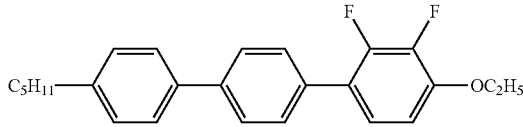 | 6 | |
| I | 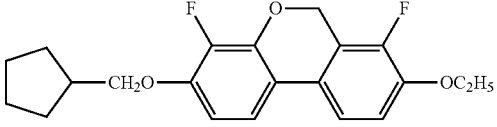 | 8 | |
| I | 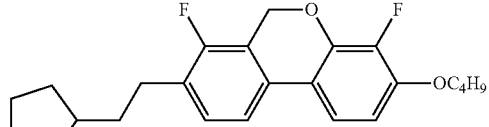 | 16 | |

TABLE 3

Proportions and property parameters of liquid crystal composition of Example 12

| Compound Formula | Liquid Crystal Structural Formula | Weight Percentage (%) | Property Parameters |
|---|---|---|---|
| V | 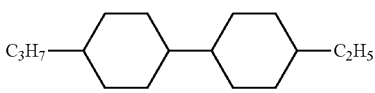 | 12 | S-N: ≤−40° C.<br>c.p: 97° C.<br>$\gamma_1$: 190 mPa·s<br>$\Delta n$: 0.145<br>$n_e$: 1.634<br>$\Delta\epsilon$: −5.0<br>$\epsilon_\perp$: 8.5<br>$K_{11}/K_{33}$: 15.5/17.3<br>The composition has no crystallization when being put at −20° C. for 480 h. |
| V | 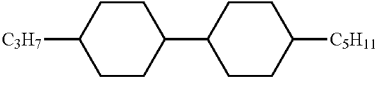 | 10 | |
| V |  | 3 | |
| V | 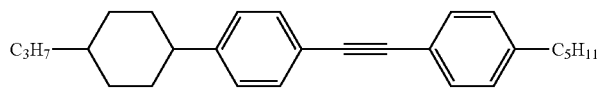 | 5 | |
| IV | 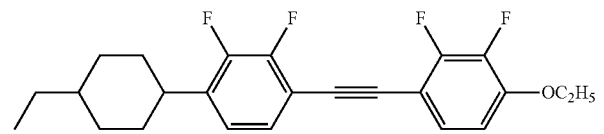 | 3 | |
| IV | 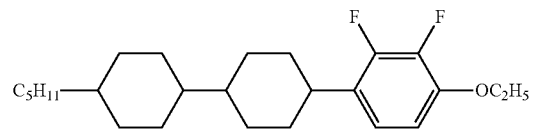 | 4 | |
| IV | 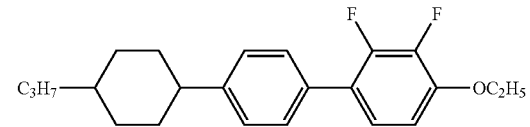 | 6 | |
| IV | 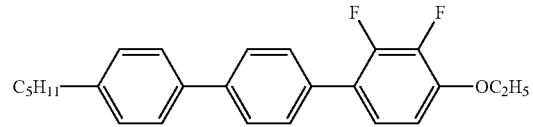 | 3 | |
| IV | 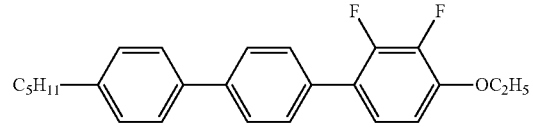 | 5 | |
| IV | 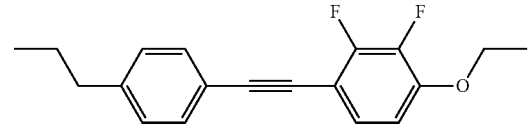 [SMILES: CCCc1ccc(C#Cc2ccc(OCC)c(F)c2F)cc1] | 15 | |
| IV | 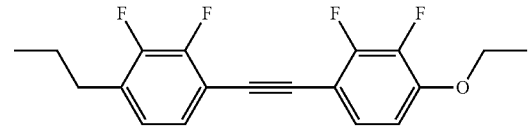 [SMILES: CCCc1ccc(C#Cc2ccc(OCC)c(F)c2F)c(F)c1F] | 13 | |

TABLE 3-continued

Proportions and property parameters of liquid crystal composition of Example 12

| Compound Formula | Liquid Crystal Structural Formula | Weight Percentage (%) | Property Parameters |
|---|---|---|---|
| I | cyclopentyl-CH₂O-[F,O-CH₂,F benzofused]-OC₄H₉ | 11 | |
| I | cyclopentyl-[F,O-CH₂,F benzofused]-OC₃H₇ | 10 | |

TABLE 4

Proportions and property parameters of liquid crystal composition of Example 13

| Compound Formula | Liquid Crystal Structural Formula | Weight Percentage (%) | Property Parameters |
|---|---|---|---|
| V | $C_3H_7$-Cy-Cy-CH=CH₂ | 17 | S-N: ≤-40° C.<br>c.p: 106<br>$\gamma_1$: 185 a · s<br>$\Delta n$: 0.132<br>$n_e$: 1.576<br>$\Delta\epsilon$: -4.8<br>$\epsilon_\perp$: 8.8<br>$K_{11}/K_{33}$: 15.9/17.2<br>The composition has no crystallization when being put at -20° C. for 480 h. |
| V | CH₂=CH-Cy-Cy-Ph-CH₃ | 12 | |
| V | $C_3H_7$-Cy-Cy-Ph-$C_3H_7$ | 4 | |
| V | $C_3H_7$-Cy-Cy-COO-Ph-$C_3H_7$ | 3 | |
| V | $C_3H_7$-Cy-Cy-COO-Ph-Cy-$C_3H_7$ | 5 | |
| IV | $C_2H_5$-Cy-Cy-Ph(F,F)-OC₂H₅ | 5 | |
| IV | $C_3H_7$-Cy-Cy-COO-Ph(F,F)-OC₂H₅ | 4 | |

TABLE 4-continued

Proportions and property parameters of liquid crystal composition of Example 13

| Compound Formula | Liquid Crystal Structural Formula | Weight Percentage (%) | Property Parameters |
|---|---|---|---|
| IV | 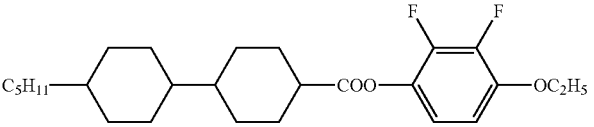 | 4 | |
| IV | 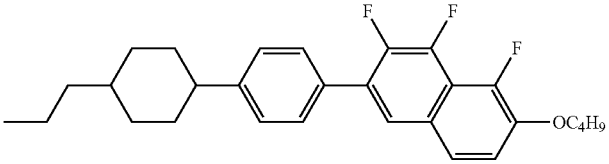 | 8 | |
| IV | 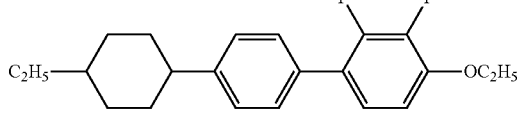 | 8 | |
| IV | 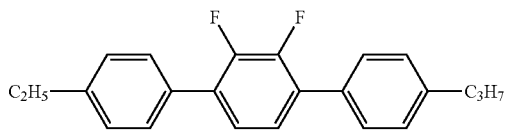 | 5 | |
| IV | 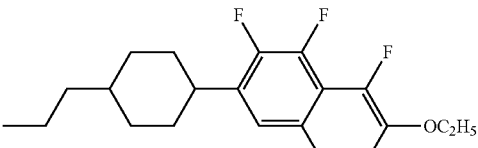 | 12 | |
| IV | 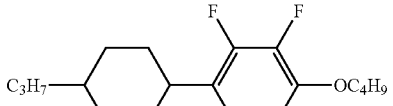 | 12 | |
| I | 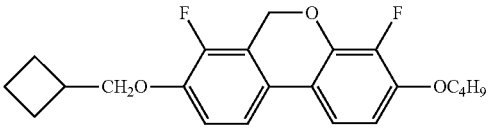 | 1 | |

TABLE 5

Proportions and property parameters of liquid crystal composition of Example 14

| Compound Formula | Liquid Crystal Structural Formula | Weight Percentage (%) | Property Parameters |
|---|---|---|---|
| V | 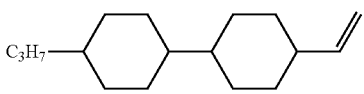 | 14 | S-N: ≤−40° C.<br>c.p: 108<br>$\gamma_1$: 136 Pa · s<br>$\Delta n$: 0.108<br>$n_e$: 1.596<br>$\Delta\epsilon$: −5.8<br>$\epsilon_\perp$: 8.9<br>$K_{11}/K_{33}$: 14.5/16.3<br>The composition has no crystallization when being put at −20° C. for 480 h. |

TABLE 5-continued
Proportions and property parameters of liquid crystal composition of Example 14
| Compound Formula | Liquid Crystal Structural Formula | Weight Percentage (%) | Property Parameters |
|---|---|---|---|
| V |  | 7 | |
| V | 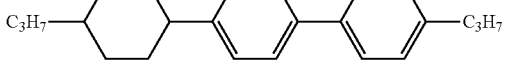 | 3 | |
| V | 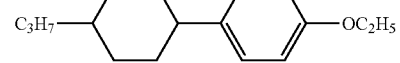 | 8 | |
| V | 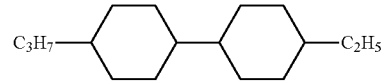 | 7 | |
| V | 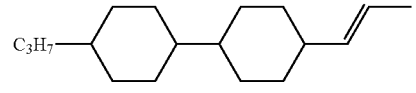 | 7 | |
| IV | 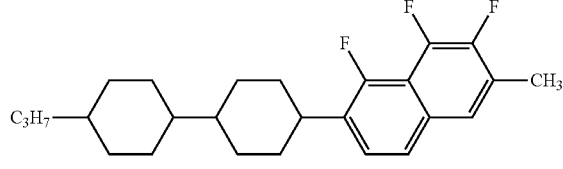 | 5 | |
| IV | 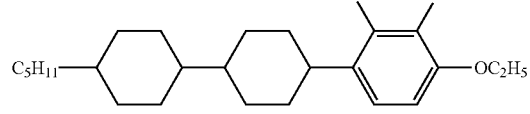 | 5 | |
| IV | 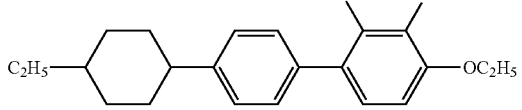 | 4 | |
| IV | 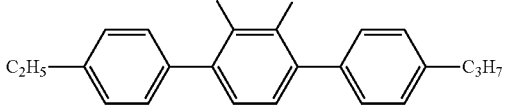 | 5 | |
| IV | 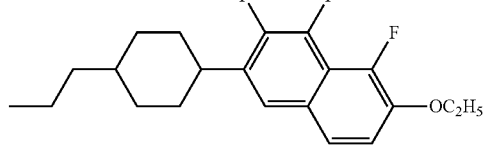 | 10 | |
| IV | 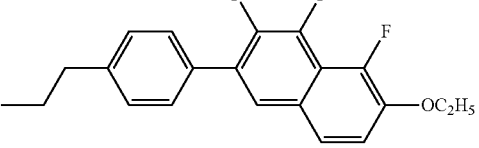 | 10 | |

TABLE 5-continued

Proportions and property parameters of liquid crystal composition of Example 14

| Compound Formula | Liquid Crystal Structural Formula | Weight Percentage (%) | Property Parameters |
|---|---|---|---|
| IV | 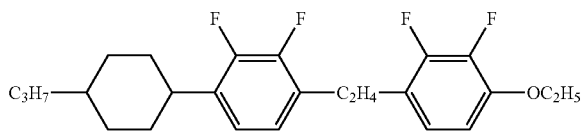 | 5 | |
| I | 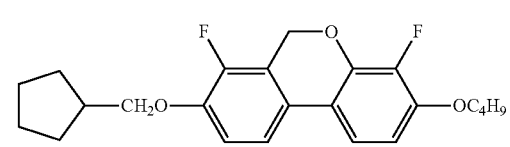 | 10 | |

TABLE 6

Proportions and property parameters of liquid crystal composition of Example 15

| Compound Formula | Liquid Crystal Structural Formula | Weight Percentage (%) | Property Parameters |
|---|---|---|---|
| V | 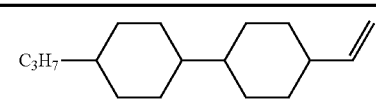 | 32 | S-N: ≤−40° C.<br>c.p: 96° C.<br>$\gamma_1$: 123 mPa · s<br>Δn: 0.124<br>$n_e$: 1.605<br>Δε: −5.7<br>$\varepsilon_\perp$: 9.1<br>$K_{11}/K_{33}$: 14.7/16.7<br>The composition has no crystallization when being put at −20° C. for 480 h. |
| IV | 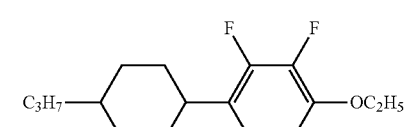 | 8 | |
| IV | 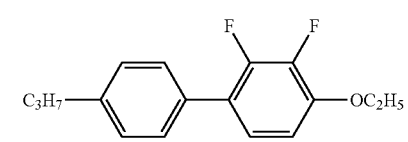 | 12 | |
| IV | 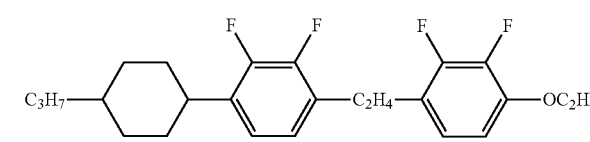 | 8 | |
| IV | 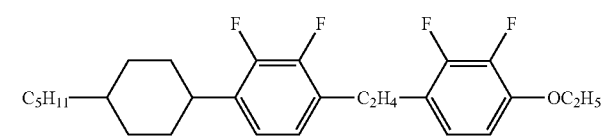 | 8 | |
| IV | 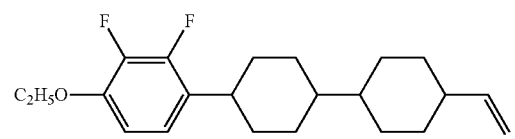 | 8 | |

TABLE 6-continued

Proportions and property parameters of liquid crystal composition of Example 15

| Compound Formula | Liquid Crystal Structural Formula | Weight Percentage (%) | Property Parameters |
|---|---|---|---|
| IV | C₂H₅O—[2,3-difluorophenyl]—[cyclohexyl]—[cyclohexyl]—CH=CH—CH₃ | 8 | |
| I | [cyclopentyl]—[phenyl]—[fluoro-chromene]—OC₂H₅ | 4 | |
| I | [cyclopentyl]—CH₂CH₂—[fluoro-chromene]—OC₄H₉ | 12 | |

TABLE 7

Proportions and property parameters of liquid crystal composition of Example 16

| Compound Formula | Liquid Crystal Structural Formula | Weight Percentage (%) | Property Parameters |
|---|---|---|---|
| V | C₃H₇—[cyclohexyl]—[cyclohexyl]—CH=CH₂ | 38 | S-N: ≤−40° C.<br>c.p: 100° C.<br>$\gamma_1$: 165 mPa·s<br>$\Delta n$: 0.115<br>$n_e$: 1.617<br>$\Delta\epsilon$: −6.3<br>$\epsilon_\perp$: 11.1<br>$K_{11}/K_{33}$: 15.1/16.6<br>The composition has no crystallization when being put at −10° C. for 480 h. |
| V | CH₂=CH—[cyclohexyl]—[cyclohexyl]—[phenyl]—CH₃ | 3 | |
| IV | propyl—[cyclohexyl]—CH₂O—[2,3-difluorophenyl]—OC₂H₅ | 5 | |
| IV | pentyl—[cyclohexyl]—CH₂O—[2,3-difluorophenyl]—OC₂H₅ | 8 | |
| IV | propyl—[cyclohexyl]—[cyclohexyl]—CH₂O—[2,3-difluorophenyl]—OC₂H₅ | 5 | |

TABLE 7-continued

Proportions and property parameters of liquid crystal composition of Example 16

| Compound Formula | Liquid Crystal Structural Formula | Weight Percentage (%) | Property Parameters |
|---|---|---|---|
| IV | Ethyl-Cy-Cy-CH2O-Ph(F,F)-OC2H5 | 5 | |
| IV | C3H7-Cy-Ph-Ph(F,F)-OC2H5 | 6 | |
| IV | C5H11-Ph-Ph-Ph(F,F)-OC2H5 | 6 | |
| I | Cyclopentyl-CH2O-[chromene(F,F)]-OC2H5 | 9 | |
| I | Cyclopentyl-CH2CH2-[chromene(F,F)]-OC4H9 | 16 | |

TABLE 8

Proportions and property parameters of liquid crystal composition of Example 17

| Compound Formula | Liquid Crystal Structural Formula | Weight Percentage (%) | Property Parameters |
|---|---|---|---|
| V | C3H7-Cy-Cy-CH=CH2 | 14 | S-N: ≤−20° C.<br>c.p: 106<br>$\gamma_1$: 139 Pa·s<br>$\Delta n$: 0.107<br>$n_e$: 1.596<br>$\Delta\epsilon$: −5.5<br>$\epsilon_\perp$: 8.7<br>$K_{11}/K_{33}$: 13.5/15.3 |
| V | CH2=CH-Cy-Cy-Ph-CH3 | 7 | |
| V | C3H7-Cy-Ph-Ph-C3H7 | 3 | |
| V | C3H7-Cy-Ph-OC2H5 | 8 | |
| V | C3H7-Cy-Cy-C2H5 | 7 | |

TABLE 8-continued

Proportions and property parameters of liquid crystal composition of Example 17

| Compound Formula | Liquid Crystal Structural Formula | Weight Percentage (%) | Property Parameters |
|---|---|---|---|
| V | C$_3$H$_7$-[Cy]-[Cy]-CH=CH-CH$_3$ | 7 | |
| IV | C$_3$H$_7$-[Cy]-[Cy]-[tetrafluoronaphthyl]-CH$_3$ | 5 | |
| IV | C$_5$H$_{11}$-[Cy]-[Cy]-[2,3-difluorophenyl]-OC$_2$H$_5$ | 5 | |
| IV | C$_2$H$_5$-[Cy]-[Ph]-[2,3-difluorophenyl]-OC$_2$H$_5$ | 4 | |
| IV | C$_2$H$_5$-[Ph]-[2,3-difluorophenyl]-[Ph]-C$_3$H$_7$ | 5 | |
| IV | C$_3$H$_7$-[Cy]-[tetrafluoronaphthyl]-OC$_2$H$_5$ | 10 | |
| IV | C$_3$H$_7$-[Ph]-[tetrafluoronaphthyl]-OC$_2$H$_5$ | 10 | |
| IV | C$_3$H$_7$-[Cy]-[2,3-difluorophenyl]-C$_2$H$_4$-[2,3-difluorophenyl]-OC$_2$H$_5$ | 5 | |
| I | C$_5$H$_{11}$O-[fluoro-chromene-fluoro]-OC$_4$H$_9$ | 5 | |

From the property parameters of the liquid crystal compositions of Examples 10 to 16, the liquid crystal compositions of the present invention have good miscibility and a very large negative dielectric constant. By comparison of Example 14 and Example 17, the dibenzopyran liquid crystal compounds having cycloalkyl terminal groups exhibit better miscibility and a very large negative dielectric constant, compared to the dibenzopyran liquid crystal compounds having a flexible alkyl chain as a terminal group, and the low temperature stability is also improved accordingly. Therefore, the compounds of the present invention, shown in formula I, may be used to improve the miscibility of liquid crystal compounds and broaden the application range of liquid crystal mixtures. In addition, the compounds may also increase the negative dielectric constants of liquid crystal mixtures, having an important application value.

Although the present invention only enumerates the specific compounds of the above eight examples and the proportions (weight percentage) thereof, and carries out the property tests, the liquid crystal compositions of the present invention may be further developed and modified on the basis of the above examples by using the liquid crystal compounds shown in formula I, IV and V of the present invention, and the preferred liquid crystal compounds shown in formula I, IV and V. Through appropriate modifications to their proportions, the purpose of the present invention may be achieved.

The invention claimed is:

1. A compound represented by formula (I):

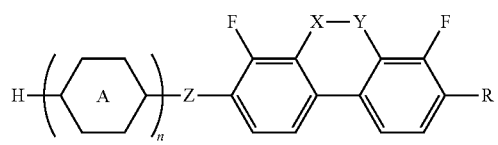

wherein in formula (I), H represents a cyclopentyl group, a cyclobutyl group or a cyclopropyl group;

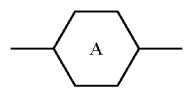

represents

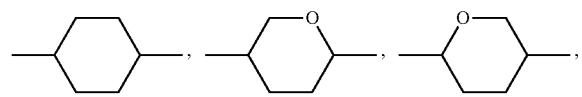

or

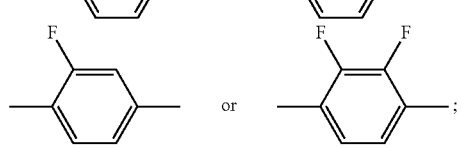

Z represents a single bond, —O—, —CH$_2$CH$_2$— or —CH$_2$O—; R represents an alkyl group having 1 to 7 carbon atoms or an alkoxy group having 1 to 7 carbon atoms; X and Y represent —CH$_2$— or —O—, but are not the same group; and n represents 0 or 1.

2. The compound according to claim 1, wherein the compound shown in formula (I) is any of the compounds shown in formula (I1) to (I18):

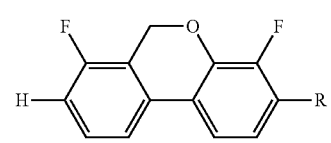

I1

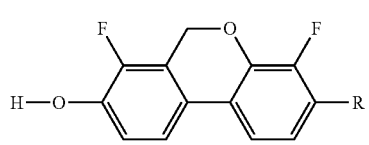

I2

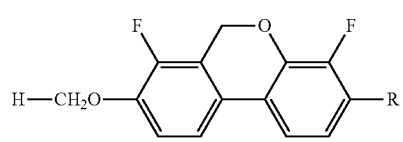

I3

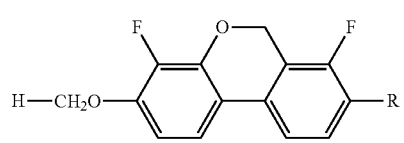

I4

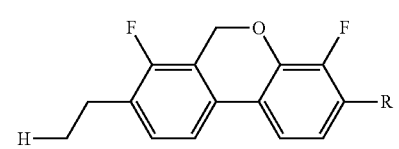

I5

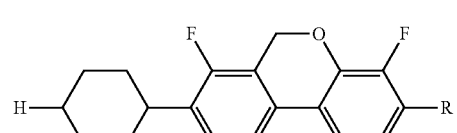

I6

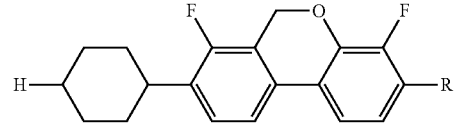

I7

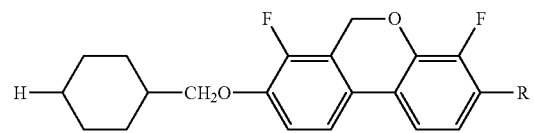

I8

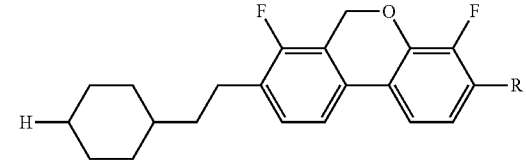

I9

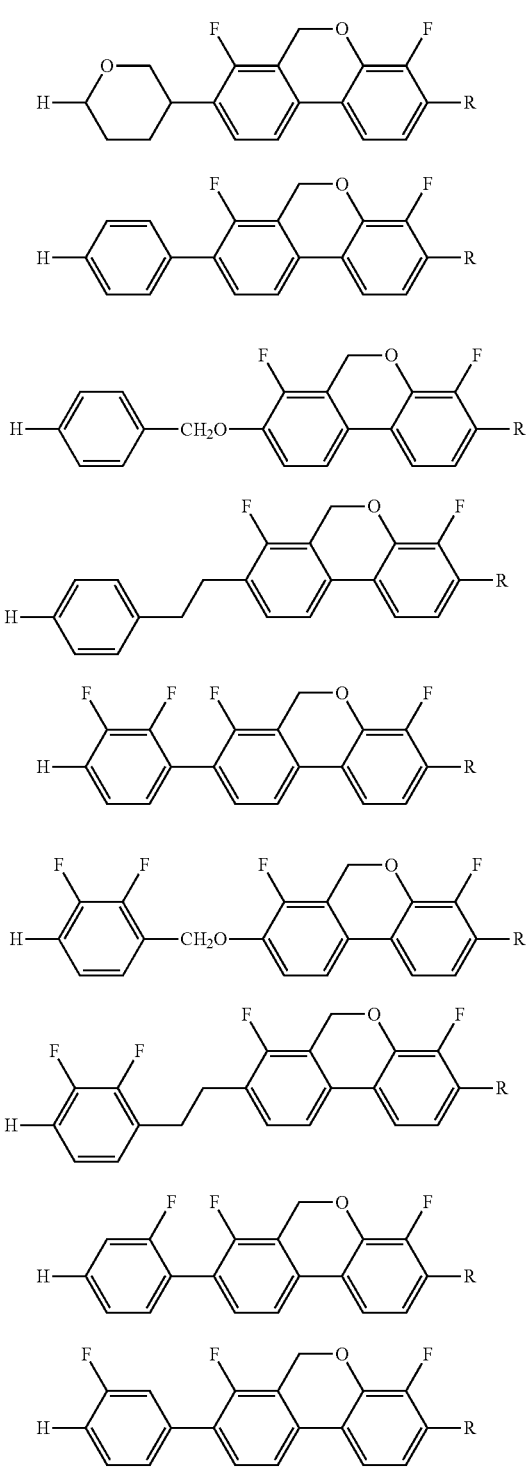
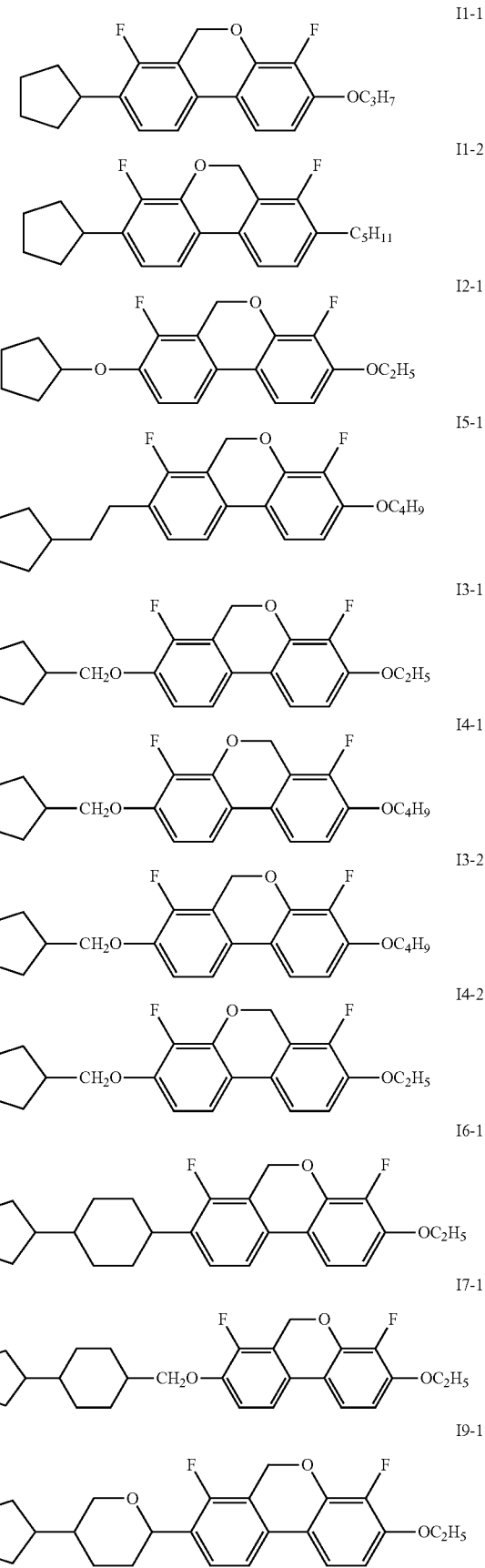
wherein in each of the compounds shown in formula (I1) to (I18), H represents a cyclopentyl group, a cyclobutyl group or a cyclopropyl group; R represents an alkyl group having 1 to 7 carbon atoms or an alkoxy group having 1-7 carbon atoms.
3. The compound according to claim 1, wherein the compound shown in formula I is any of the compounds below:

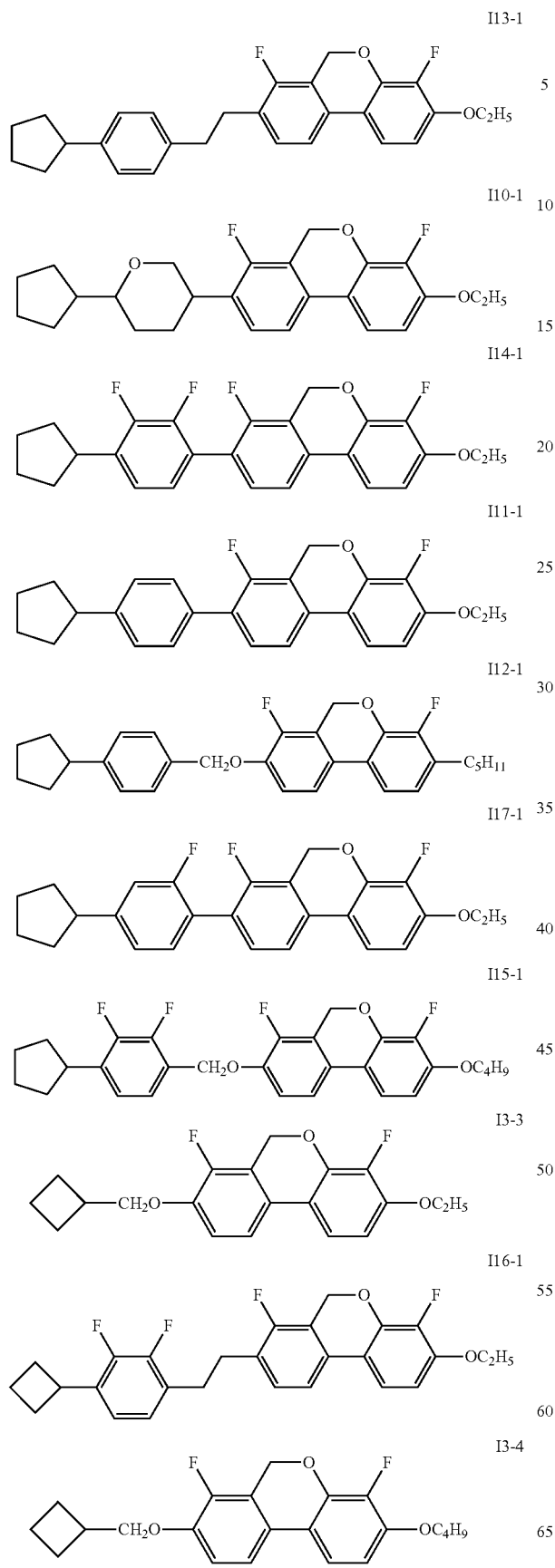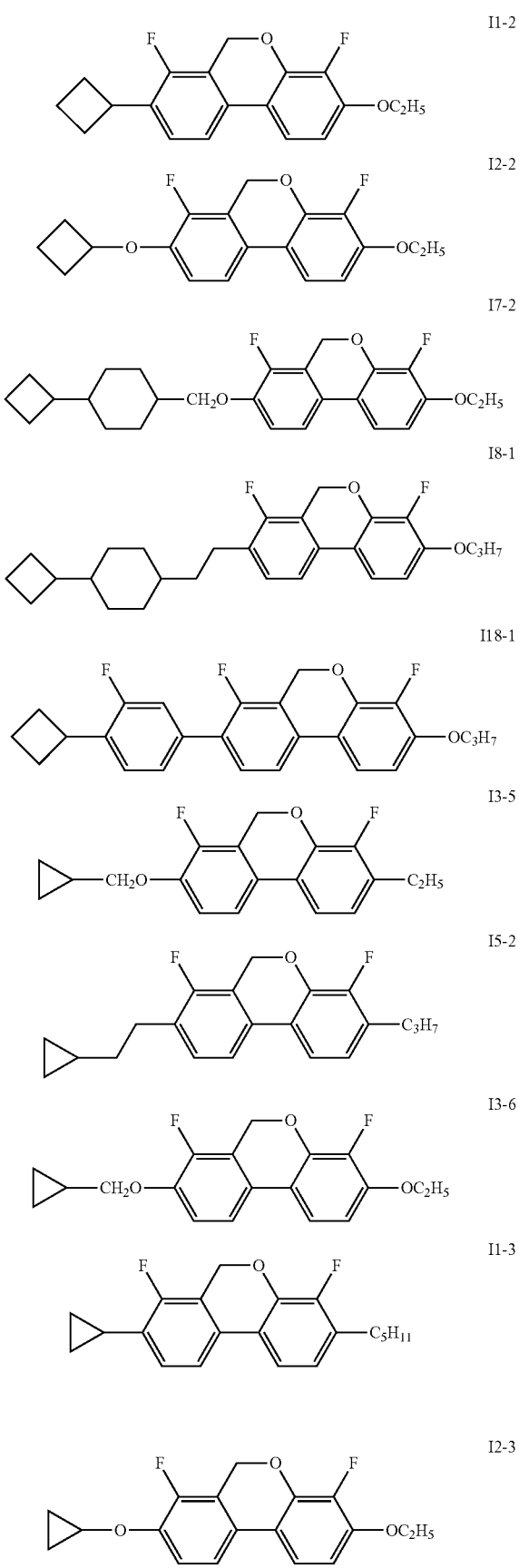

-continued

I7-3
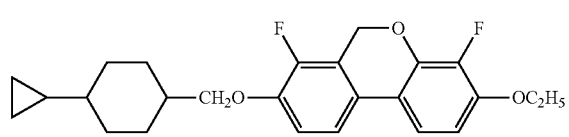

I11-2
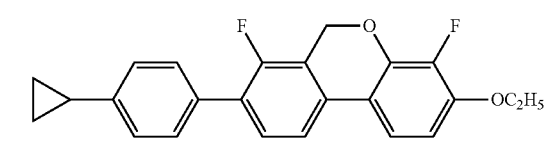

I15-2
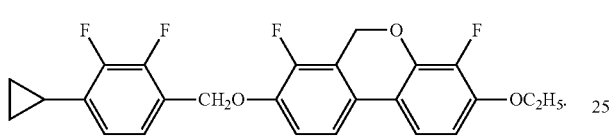

4. A liquid crystal medium comprising one or more compounds defined in claim 1.

5. The liquid crystal medium according to claim 4, further comprising one or more compounds shown in formula IV:

IV
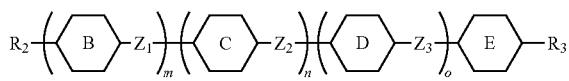

wherein in formula IV, $R_2$ and $R_3$ each independently represent any of the following groups (1) to (3):
(1) a linear alkyl group having 1 to 7 carbon atoms or a linear alkoxy group having 1 to 7 carbon atoms;
(2) a group formed by substituting one or more —$CH_2$— in any of the groups in (1) with —O—, —COO—, —OOC— or —CH=CH—;
(3) a group formed by substituting one or more —H in any of the groups in (1) with —F, —Cl, —CH=$CH_2$ or —CH=CH—$CH_3$;
rings B, C, D and E each independently represent the following groups:

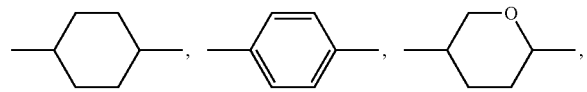

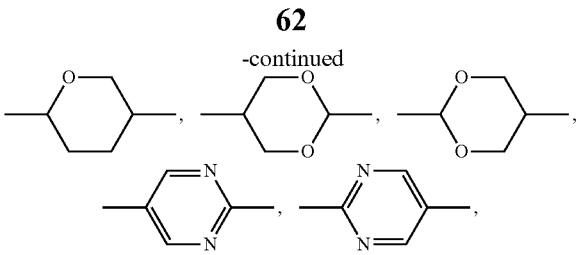

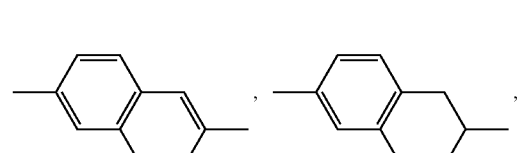

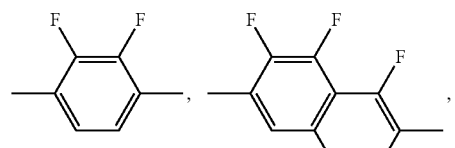

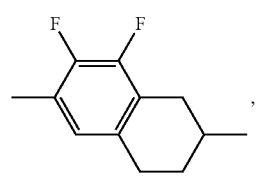

and at least one of the rings B, C, D and E is selected from

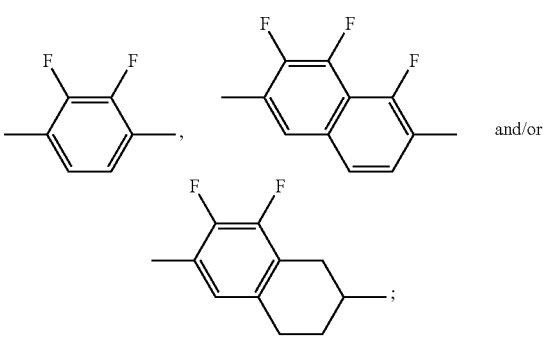

and/or m, n and o each independently represent 0 or 1;
$Z_1$, $Z_2$ and $Z_3$ each independently represent a single bond, —$C_2H_4$—, —CH=CH—, —COO—, —OOC—, —$CH_2O$—, —$OCH_2$—, —$CF_2O$— or —$OCF_2$—;
additionally, any H atom in the groups may be substituted by F atom.

6. The liquid crystal medium according to claim 5, further comprising one or more compounds shown in formula V:

V
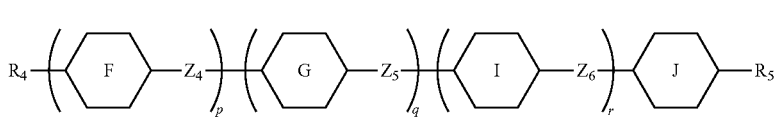

wherein in formula V, $R_4$ and $R_5$ each independently represent an alkyl group having 1 to 10 carbon atoms or an alkenyl group having 2 to 10 carbon atoms; additionally, any —$CH_2$— in the groups may be substituted by —$CH_2O$—, —$OCH_2$— or —C≡C—, and any H atom in the groups may be substituted by F atom; rings F, G, I, and J each independently represent the following groups:

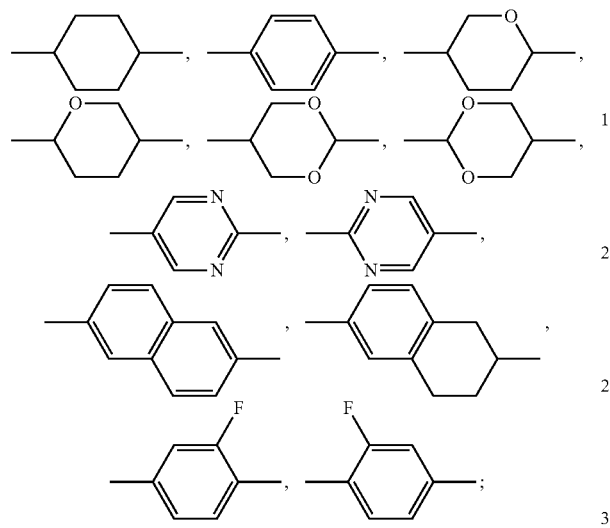

p, q and r each independently represent 0 or 1;

$Z_4$, $Z_5$ and $Z_6$ each independently represent a single bond, —$C_2H_4$—, —CH=CH—, —COO—, —OOC—, —$CH_2O$—, —$OCH_2$—, —$CF_2O$— or —$OCF_2$—; additionally, any H atom in the groups may be substituted by F atom.

7. The liquid crystal medium according to claim 6, wherein the total weight percentage of one or more compounds shown in formula I is 1% to 24%, the total weight percentage of one or more compounds shown in formula IV is 35% to 58%, and the total weight percentage of one or more compounds shown in formula V is 30% to 55%.

8. The liquid crystal medium according to any one of claims 5 to 7, wherein one or more compounds shown in formula IV are one or more compounds shown in formula IV a to formula IV o:

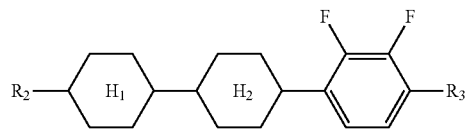

IVa

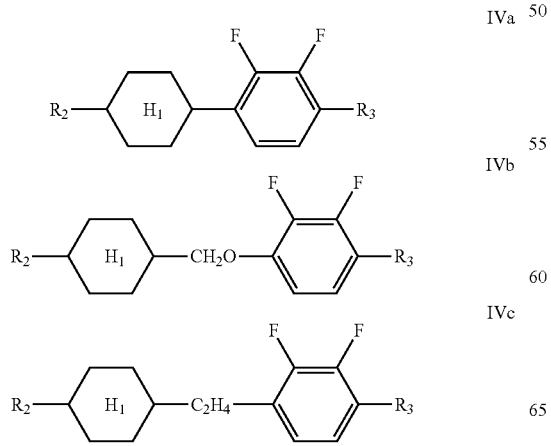

IVb

IVc

-continued

IVd

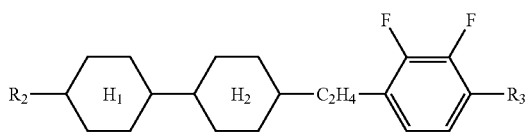

IVe

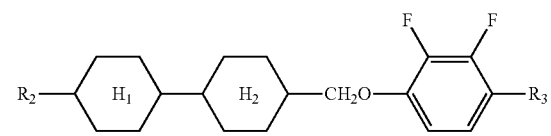

IVf

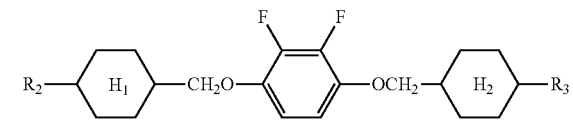

IVg

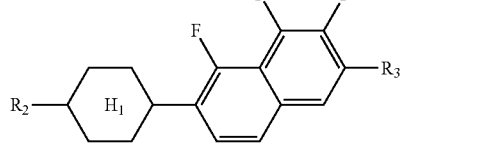

IVh

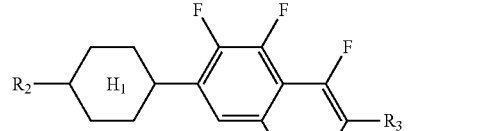

IVi

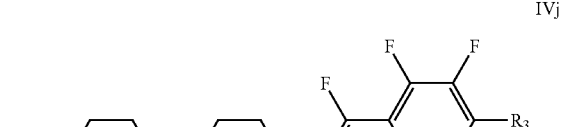

IVj

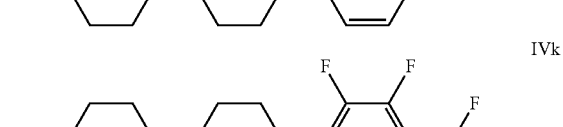

IVk

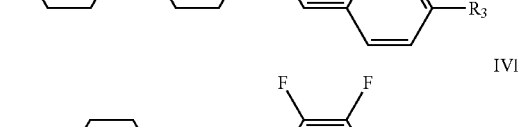

IVl

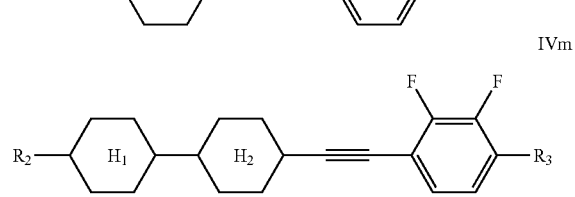

IVm

-continued

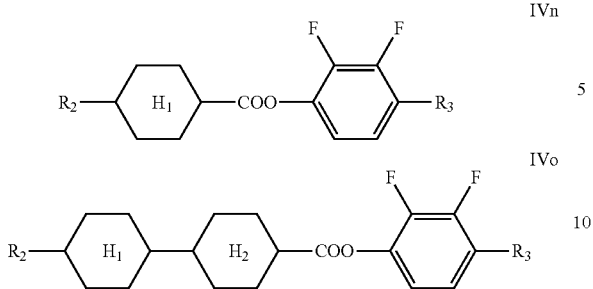

wherein $R_2$ and $R_3$ each independently represent any of the following groups (1) to (3):
(1) a linear alkyl group having 1 to 7 carbon atoms or a linear alkoxy group having 1 to 7 carbon atoms;
(2) a group formed by substituting one or more —CH$_2$— in any of the groups in (1) with —O—, —COO—, —OOC— or —CH=CH—;
(3) a group formed by substituting one or more —H in any of the groups in (1) with —F, —Cl, —CH=CH$_2$ or —CH=CH—CH;

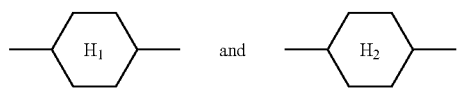

each independently represent any of the following groups:

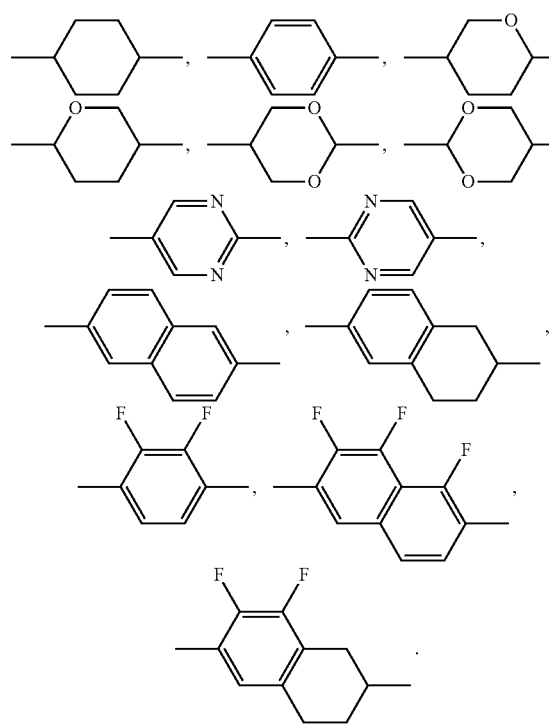

9. The liquid crystal medium according to claim 6, wherein one or more compounds shown in formula V are one or more compounds shown in formula V a to formula V p:

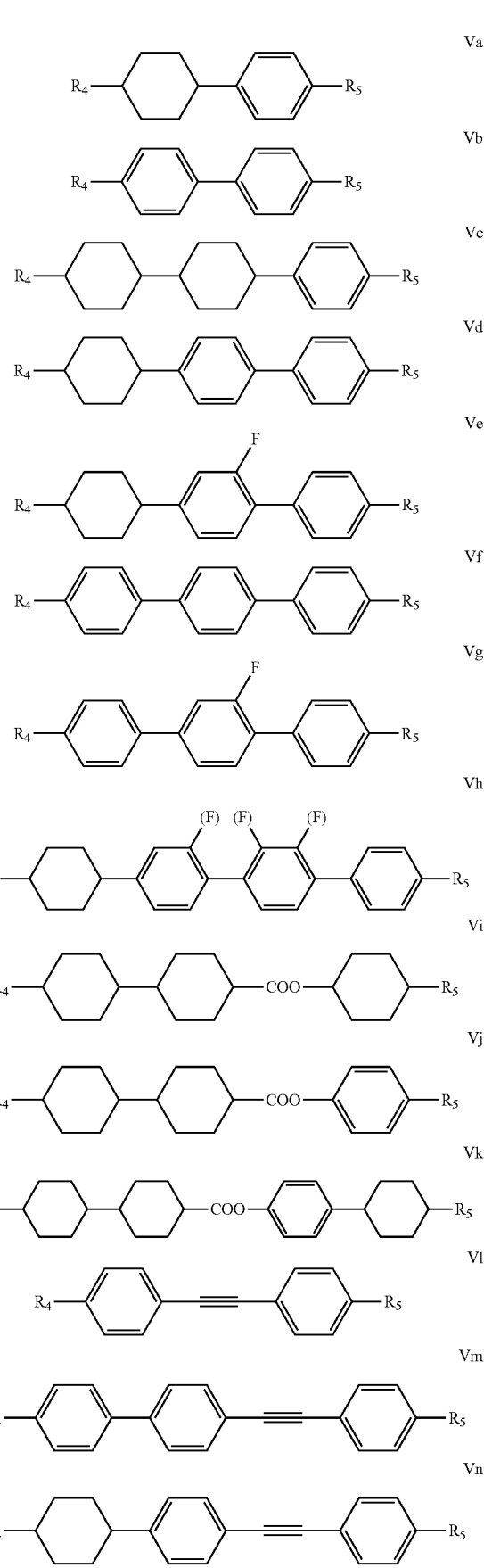

-continued

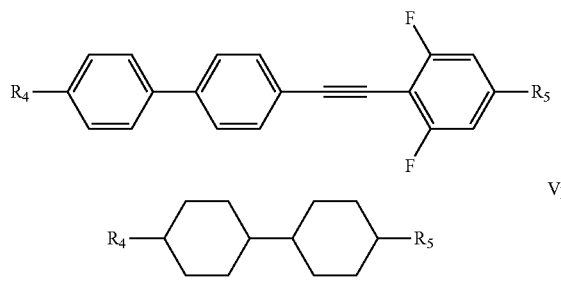

wherein $R_4$ and $R_5$ each independently represent an alkyl group having 1 to 10 carbon atoms or an alkenyl group having 2 to 10 carbon atoms; additionally, any —$CH_2$— in the groups may be substituted by —$CH_2O$—, —$OCH_2$— or —C≡C—, and any H atom in the groups may be substituted by F atom; (F) each independently represents F or H.

10. Application of any one or more compounds defined in claim 6 in preparing liquid crystal mixtures, liquid crystal display devices or electrooptic display devices.

11. A liquid crystal mixture, a liquid crystal display device or an electrooptic display device comprising any one or more compounds defined in claim 1.

12. Application of the liquid crystal medium defined in claim 5 in preparing liquid crystal display devices or electrooptic display devices.

13. A liquid crystal mixture, a liquid crystal display device or an electrooptic display device comprising the liquid crystal medium defined in any one of claims 4, 5, 6, 7, and 9.

14. A liquid crystal mixture, a liquid crystal display device or an electrooptic display device comprising the liquid crystal medium defined in claim 8.

* * * * *